United States Patent
Gupta et al.

(10) Patent No.: US 8,957,536 B2
(45) Date of Patent: Feb. 17, 2015

(54) WIND TURBINE

(71) Applicant: Vestas Wind Systems A/S, Aarhus N (DK)

(72) Inventors: Amit Kumar Gupta, Singapore (SG); Anshuman Tripathi, Singapore (SG); Ramasamy Anbarasu, Lubeck (DE); Ove Styhm, Hadsten (DK); Gil Lampong Opina, Jr., Singapore (SG); Yugarajan Karuppanan, Singapore (SG); Bing Li, Singapore (SG); Shu Yu Cao, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 170 days.

(21) Appl. No.: 13/728,656

(22) Filed: Dec. 27, 2012

(65) Prior Publication Data

US 2013/0200620 A1 Aug. 8, 2013

Related U.S. Application Data

(63) Continuation of application No. PCT/DK2011/050243, filed on Jun. 29, 2011.

(60) Provisional application No. 61/359,841, filed on Jun. 30, 2010.

(30) Foreign Application Priority Data

Jun. 30, 2010 (DK) .............................. 2010 70307

(51) Int. Cl.
F03D 9/00 (2006.01)

(52) U.S. Cl.
USPC .............................................. 290/44; 322/29

(58) Field of Classification Search
USPC ............................ 290/43, 44, 55; 322/29, 22
See application file for complete search history.

(56) References Cited

U.S. PATENT DOCUMENTS 7,276,807 B2 * 10/2007 Luetze et al. .................... 290/44
8,093,742 B2 *  1/2012 Gupta et al. .................... 290/44

(Continued)

FOREIGN PATENT DOCUMENTS

| EP | 1819023 A2 | 8/2007 |
|----|-----------|--------|
| EP | 1863162 A2 | 12/2007 |
| WO | 03065567 A1 | 8/2003 |

OTHER PUBLICATIONS

Danish Patent and Trademark Office Search Report dated Jan. 24, 2011 for DK application No. PA 2010 70307.

(Continued)

*Primary Examiner* — Nicholas Ponomarenko
(74) *Attorney, Agent, or Firm* — Patterson & Sheridan, LLP

(57) ABSTRACT

A wind turbine is provided. The wind turbine includes a generator, an output thereof being connectable to a power grid via a power transmission path, the power transmission path comprising a generator side converter coupled to the output of the generator, a grid side converter coupled to the power grid, and a DC link coupled between the generator side converter and the grid side converter. For diverting the generator power, a load dump arrangement is provided which includes at least one resistor, a plurality of switches, and a plurality of electrical connections which electrically connect the at least one resistor to the output of the generator and across the DC link via the plurality of switches. One common and configurable load dump is used for both converter system failures and grid failures. As compared to two separate load dumps for converter failures and grid failures, the single load dump will require a smaller space for a wind turbine. Thus, the weight and size of the power converter system may be reduced.

22 Claims, 19 Drawing Sheets

(56) References Cited

U.S. PATENT DOCUMENTS

| | | |
|---|---|---|
| 8,395,360 B2 * | 3/2013 | Tripathi et al. .............. 322/29 |
| 2007/0210651 A1 | 9/2007 | Ichinose et al. |
| 2009/0200803 A1 | 8/2009 | Ichinose et al. |
| 2012/0217824 A1 * | 8/2012 | Gupta et al. .............. 307/145 |
| 2014/0217730 A1 * | 8/2014 | Styhm et al. .............. 290/44 |

OTHER PUBLICATIONS

PCT International Search Report dated Apr. 12, 2012 for International Application No. PCT/DK2011/050243, 4 pages.

* cited by examiner

WIND TURBINE

CROSS-REFERENCE TO RELATED APPLICATIONS

This application is a continuation of co-pending PCT patent application No. PCT/DK2011/050243, filed Jun. 29, 2011, which claims the benefit of Danish patent application serial number PA 2010 70307, filed Jun. 30, 2010 and U.S. provisional patent application Ser. No. 61/359,841, filed Jun. 30, 2010. Each of the aforementioned related patent applications is herein incorporated by reference in its entirety

TECHNICAL FIELD

The present invention relates generally to a wind turbine.

BACKGROUND

One or two load dumps can be used for a permanent magnet (PM) generator based wind turbine. If one load dump is used, it can be placed across the DC link or across the terminals of PM generator. If two load dumps are used, one can be placed across the DC link and another can be placed across the terminals of PM generator. In events of grid failure or converter failure, one or both load dumps can be used for a full scale converter based wind turbine.

For a full scale converter based wind turbine with two load dumps, the first load dump connected to the output terminals of the generator may be rated about 1-2 times of the second load dump connected across the DC link. The ratings of the load dumps are based on the power dissipation capacity. For higher power (e.g. 6-15 MW) wind turbines, a significantly bigger load dump might be required at the generator output terminals and across the DC link terminals. Hence, there may be a significant increase in cost, weight and size/space required for the load dumps with the increase in turbine power.

SUMMARY

According to one embodiment of the present invention, a wind turbine is provided. The wind turbine includes a generator, an output thereof being connectable to a power grid via a power transmission path, the power transmission path including a generator side converter coupled to the output of the generator, a grid side converter coupled to the power grid, and a DC link coupled between the generator side converter and the grid side converter; and a load dump arrangement, including at least one resistor, a plurality of switches, and a plurality of electrical connections which electrically connect the at least one resistor to the output of the generator and across the DC link via the plurality of switches. One load dump arrangement can be used for both converter failures and grid failures. As compared to two separate load dumps for converter failures and grid failures, the single load dump may require a smaller cost, size and weight in the wind turbine. Thus, the weight and size of the power converter system may be reduced. Furthermore, for a wind turbine with a higher power rating, the space required for a single load dump is lesser than two load dumps. The same is true for the weight.

According to one embodiment of the present invention, the power transmission path is connectable to the generator via a plurality of first switches and is connectable to the power grid via a plurality of second switches. Power transmission is routed from the generator to the power grid.

According to one embodiment of the present invention, the load dump arrangement is connectable to the generator via at least one third switch and is connectable across the DC link of the power transmission path via at least one fourth switch.

According to one embodiment of the present invention, the generator output includes three terminals, and the load dump arrangement includes three third switches respectively comprising a first terminal and a second terminal, three resistors respectively comprising a first terminal and a second terminal, three fifth switches respectively comprising a first terminal and a second terminal, a fourth switch comprising a first terminal and a second terminal, and three sixth switches respectively comprising a first terminal and a second terminal. Different arrangements of the three third switches, the three resistors, the three fifth switches, the fourth switch and the three sixth switches are possible. As one example, the first terminal of each third switch is connected to a corresponding output terminal of the generator, and the second terminal of each third switch is connected to the second terminal of a corresponding sixth switch and the first terminal of a corresponding resistor. The first terminal of each sixth switch is connected to a first line of the DC link. The second terminal of each resistor is connected to the first terminal of a corresponding fifth switch. The second terminal of each fifth switch is connected to the first terminal of the fourth switch. The second terminal of the fourth switch is electrically connected to a second line of the DC link.

According to one embodiment of the present invention, the generator output includes three terminals, and the load dump arrangement includes three third switches respectively comprising a first terminal and a second terminal, three diodes respectively comprising an anode and a cathode, three resistors respectively comprising a first terminal and a second terminal, three fifth switches respectively comprising a first terminal and a second terminal, a fourth switch comprising a first terminal and a second terminal, and a sixth switch comprising a first terminal and a second terminal. Different arrangements of the three third switches, the three diodes, the three resistors, the three fifth resistors, the fourth switch and the sixth switch are possible. As one example, the first terminal of each third switch is connected to a corresponding output terminal of the generator, and the second terminal of each third switch is connected to the cathode of a corresponding diode. The anode of each diode is connected to the first terminal of the sixth switch, and the cathode of each diode is further connected to the first terminal of a corresponding resistor. The second terminal of the sixth switch is connected to a first line of the DC link. The second terminal of each resistor is connected to the first terminal of a corresponding fifth switch. The second terminal of each fifth switch is connected to the first terminal of the fourth switch. The second terminal of the fourth switch is electrically connected to a second line of the DC link.

According to one embodiment of the present invention, the generator output includes three terminals, and the load dump arrangement includes a first third switch comprising a first terminal and a second terminal, a second third switch comprising a first terminal and a second terminal, a three phase bridge rectifier comprising three first diodes and three second diodes, a resistor bank having a plurality of resistors connected in parallel, the resistor bank comprising a first terminal and a second terminal, and a fourth switch comprising a first terminal and a second terminal. Each first diode has an anode and a cathode, and each second diode has an anode and a cathode. Different arrangements of the first third switch, the second third switch, the three first diodes, the three second diodes, the resistor bank and the fourth switch are possible. As one example, the cathode of each first diode is connected to the anode of a corresponding second diode and a corresponding output terminal of the generator, the anodes of the three first diodes are connected together, and the cathodes of the three second diodes are connected together, the first terminal of the first third switch is connected to the anodes of the three first diodes, and the second terminal of the first third switch is connected to the first terminal of the resistor bank. The first terminal of the second third switch is connected to the cathodes of the three second diodes, and the second terminal of the second third switch is connected to the second terminal of the resistor bank and a first line of the DC link. The first terminal of the resistor bank is further connected to the first terminal of the fourth switch. The second terminal of the fourth switch is connected to a second line of the DC link.

According to one embodiment of the present invention, the wind turbine further includes a controlling unit configured to detect a converter failure or a grid failure, and to control the respective switches.

According to one embodiment of the present invention, under normal operating conditions of the wind turbine, the controlling unit is configured to close the plurality of first switches and the plurality of second switches to connect the power transmission path to the generator and the power grid.

According to one embodiment of the present invention, upon detection of a converter failure, the controlling unit is configured to close the at least one third switch or one or more of the at least one third switch and the fifth switches to connect the at least one resistor of the load dump arrangement to the output of the generator.

According to one embodiment of the present invention, upon detection of a converter failure, the controlling unit is configured to open the plurality of first switches to disconnect the power transmission path from the generator.

According to one embodiment of the present invention, upon detection of a grid failure, the controlling unit is configured to close the at least one fourth switch or one or more of the at least one fourth switch, the fifth switches and the one or more sixth switches to connect the at least one resistor of the load dump arrangement across the DC link of the power transmission path.

According to one embodiment of the present invention, the wind turbine further includes a plurality of power transmission paths. Each power transmission path connects the output of the generator to the power grid and includes a generator side converter coupled to the output of the generator, a grid side converter coupled to the power grid, and a DC link coupled between the generator side converter and the grid side converter; wherein the electrical connections electrically connect the at least one resistor to the output of the generator and each of the plurality of DC links via the plurality of switches.

According to one embodiment of the present invention, each power transmission path is connectable to the generator via a corresponding plurality of first switches and is connectable to the power grid via a corresponding plurality of second switches.

According to one embodiment of the present invention, the load dump arrangement is connectable across the DC link of each power transmission path via a corresponding at least one fourth switch.

According to one embodiment of the present invention, upon detection of a converter failure in one or more of the plurality of power transmission paths, the controlling unit is configured to close the at least one third switch or one or more of the at least one third switch and the fifth switches to connect the at least one resistor of the load dump arrangement to the output of the generator.

According to one embodiment of the present invention, upon detection of a converter failure in one or more of the plurality of power transmission paths, the controlling unit is configured to open the corresponding plurality of first switches to disconnect the one or more of the plurality of power transmission paths from the generator.

According to one embodiment of the present invention, upon detection of a grid failure, the controlling unit is configured to close the corresponding at least one fourth switch or one or more of the corresponding at least one fourth switch, the fifth switches and the corresponding one or more sixth switches to connect the at least one resistor of the load dump arrangement across the corresponding DC link of the one or more of the plurality of power transmission paths.

According to one embodiment of the present invention, the wind turbine further includes a plurality of load dump arrangements. Each load dump arrangement is connectable to the generator via a corresponding at least one third switch or one or more of a corresponding at least one third switch and corresponding fifth switches, and is connectable across the DC link of the corresponding power transmission path via a corresponding at least one fourth switch or one or more of a corresponding at least one fourth switch, the corresponding fifth switches and corresponding one or more sixth switches.

According to one embodiment of the present invention, upon detection of a converter failure in one or more of the plurality of power transmission paths, the controlling unit is configured to close the corresponding at least one third switch or one or more of the corresponding at least one third switch and the corresponding fifth switches to connect the at least one resistor of one or more of the corresponding load dump arrangements to the output of the generator.

According to one embodiment of the present invention, upon detection of a converter failure in one or more of the plurality of power transmission paths, the controlling unit is configured to open one or more of the corresponding plurality of first switches to disconnect the one or more of the plurality of power transmission paths from the generator.

According to one embodiment of the present invention, upon detection of a grid failure, the controlling unit is configured to close the corresponding at least one fourth switch or one or more of the corresponding at least one fourth switch, the corresponding fifth switches and the corresponding one or more sixth switches to connect the at least one resistor of one or more of the corresponding load dump arrangements across the corresponding DC link of the one or more of the plurality of power transmission paths.

According to one embodiment of the present invention, any suitable types of switches can be used in the load dump arrangement. Some examples of the switches may include breakers, contactors, and semiconductor power switches e.g. insulated-gate bipolar transistors (IGBT), metal oxide semiconductor field effect transistor (MOSFET), gate turn-off (GTO) thyristors and anti-parallel thyristors.

According to one embodiment of the present invention, the generator side converter is an AC-to-DC converter.

According to one embodiment of the present invention, the grid side converter is a DC-to-AC converter.

BRIEF DESCRIPTION OF THE SEVERAL
VIEWS OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5b shows a schematic drawing of a rectifier bridge usable in a load dump arrangement of FIG. 5a.

FIG. 5c shows a schematic drawing of a half silicon-controller rectifier (SCR) bridge usable in a load dump arrangement of FIG. 5a.

FIG. 5d shows a schematic drawing of a full silicon-controller rectifier (SCR) bridge usable in a load dump arrangement of FIG. 5a.

DETAILED DESCRIPTION

Figure 1:
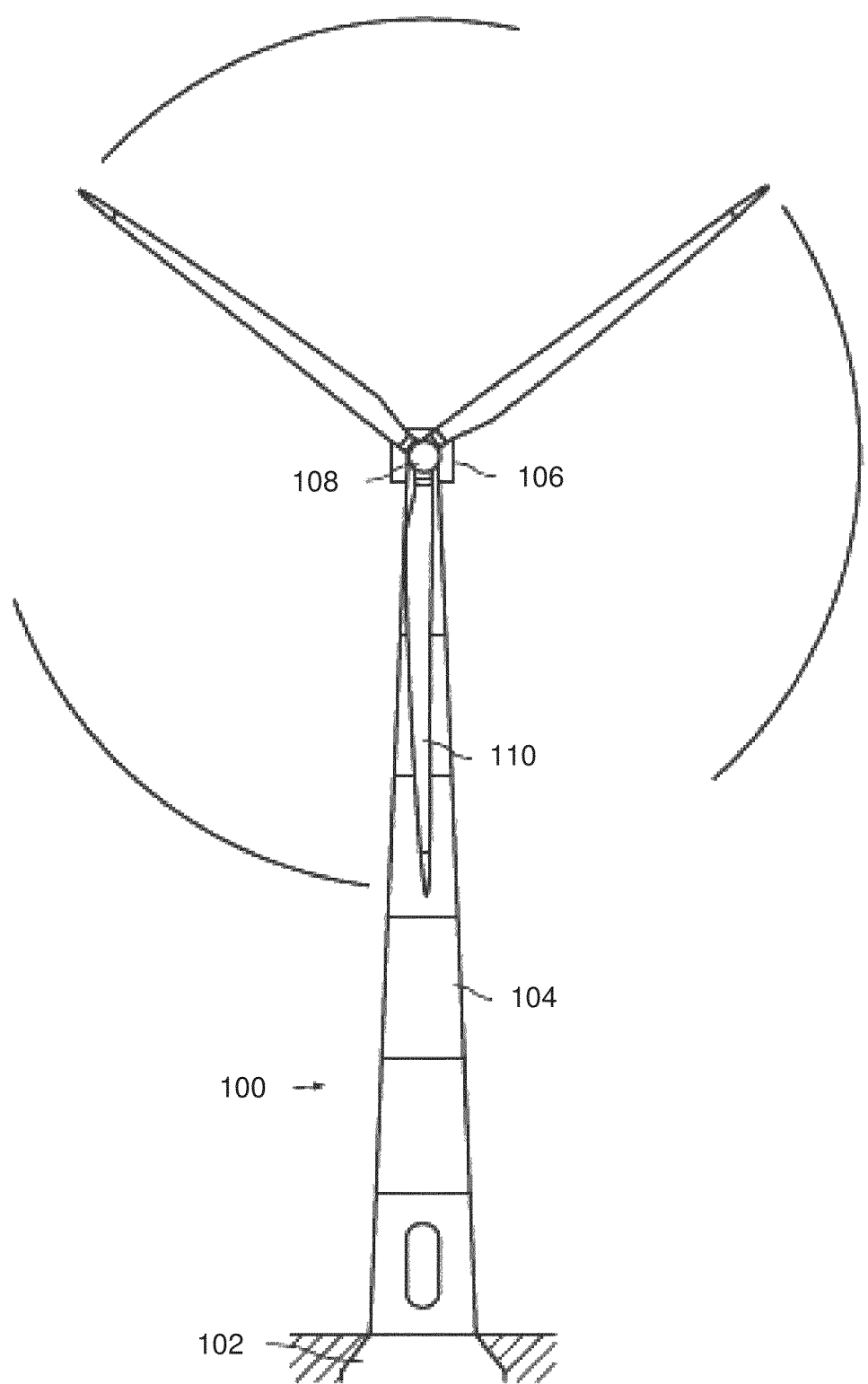
FIG. 1 illustrates a common setup of a conventional wind turbine.

FIG. 1 illustrates a common setup of a conventional wind turbine 100. The wind turbine 100 is mounted on a base 102. The wind turbine 100 includes a tower 104 having a number of tower sections, such as tower rings. A wind turbine nacelle 106 is placed on top of the tower 104. The wind turbine rotor includes a hub 108 and at least one rotor blade 110, e.g. three rotor blades 110. The rotor blades 110 are connected to the hub 108 which in turn is connected to the nacelle 106 through a low speed shaft which extends out of the front of the nacelle 106.

Figure 2:
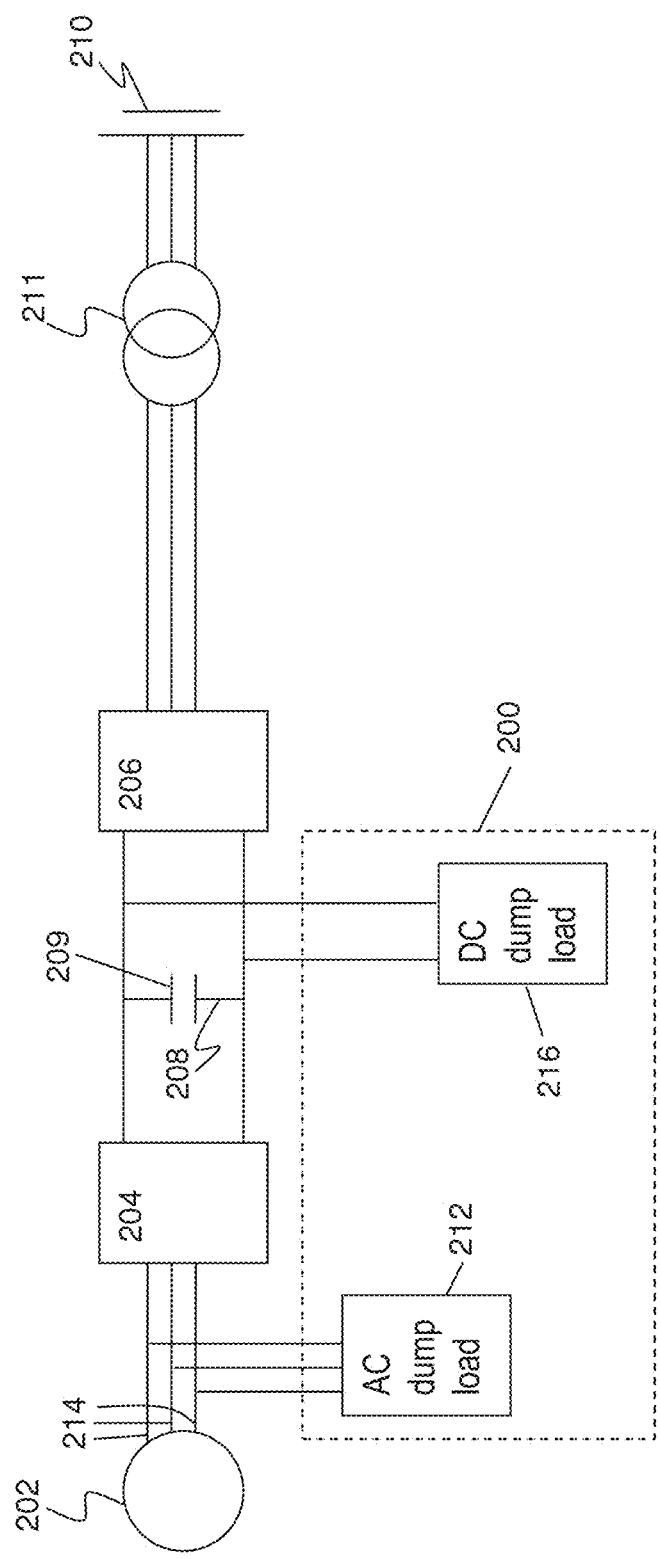
FIG. 2 shows a schematic drawing of a conventional load dump arrangement usable in a wind turbine with two load dumps.

FIG. 2 shows a conventional load dump arrangement 200 usable in a wind turbine. The wind turbine includes a generator 202, an AC (alternating current)-to-DC (direct current) power converter 204 (generator-side converter), a DC-to-AC power converter 206 (line-side converter), and a DC link 208 comprising a DC capacitor 209 connected between the AC-to-DC power converter 204 and the DC-to-AC power converter 206. The generator 202 of the wind turbine is connected to the AC-to-DC power converter 204. The DC-to-AC power converter 206 is connected to a power grid 210 via a transformer 211.

A first load dump 212 of the load dump arrangement 200 is connected to output terminals 214 of the generator 202, corresponding to a 3-phase AC output of the generator 202. The first load dump 212 can be called as AC load dump. The first load dump 212 may be a three-phase load dump which is essentially a three phase resistor bank. A second load dump 216 of the load dump arrangement 200 is connected across the DC link 208. The second load dump 216 can be called as DC load dump. Generally, the first load dump 212 is turned on when there is a converter failure, and the second load dump 216 is turned on when there is a grid failure.

The load dump arrangement 200, the generator 202, the AC-to-DC power converter 204, the DC-to-AC power converter 206, and the transformer 211 may be part of a wind turbine 100 as shown in FIG. 1, and are typically located within the nacelle 106 of the wind turbine 100. The conventional load dump arrangement 200 has two separate load dumps 212, 216 for converter failures and grid failures. As such, the conventional load dump arrangement 200 requires a larger weight, size and space in the nacelle 106.

Figure 3:
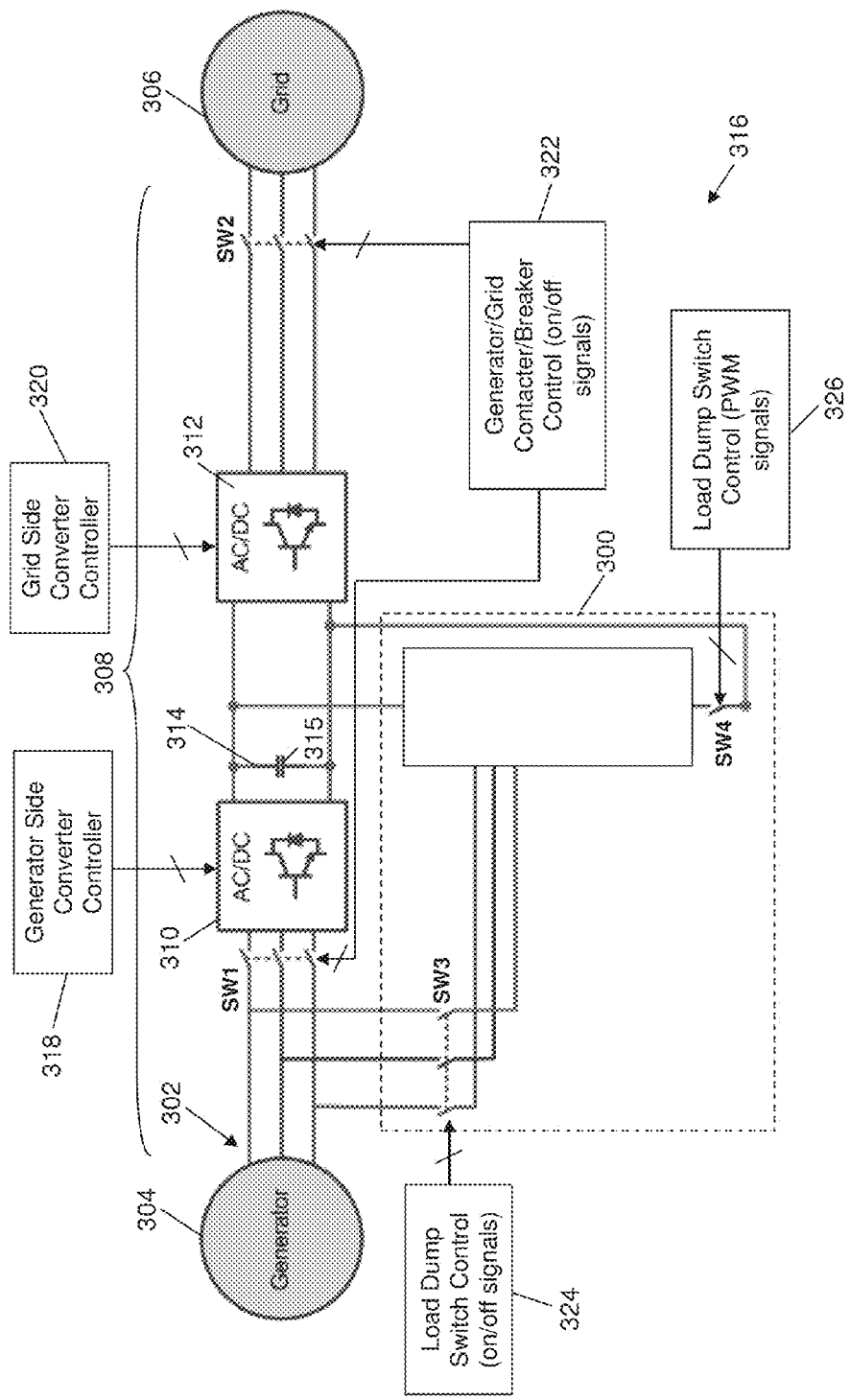
FIG. 3 shows a schematic drawing of a load dump arrangement usable in a wind turbine according to an embodiment of the present invention.

FIG. 3 shows a load dump arrangement 300 usable in a wind turbine according to one embodiment of the present invention. An output 302 of a generator 304 of the wind turbine is connectable to a power grid 306 via a power transmission path 308. The power transmission path 308 has a generator side converter 310 coupled to the output 302 of the generator 304, a grid side converter 312 coupled to the power grid 306, and a DC link 314 having a DC link capacitor 315 coupled between the generator side converter 310 and the grid side converter 312. The power transmission path 308 is connectable to the generator 304 via a plurality of first switches SW1 and is connectable to the power grid 306 via a plurality of second switches SW2. More specifically, the generator side converter 310 is connectable to the output 302 of the generator 304 via a plurality of first switches SW1 and the grid side converter 312 is connectable to the power grid 306 via a plurality of second switches SW2. The generator side converter 310 may be an AC-to-DC converter and the grid side converter 312 may be a DC-to-AC converter. Power transmission is routed from the generator to the power grid.

In one embodiment, the load dump arrangement 300 has at least one resistor (not shown), a plurality of switches, a plurality of electrical connections which electrically connect the at least one resistor to the output 302 of the generator 304 and the DC link 314 via the plurality of switches. For example, the load dump arrangement 300 is connectable to the generator 304 via at least one third switch SW3 (e.g. a plurality of third switches SW3) and is connectable across the DC link 314 of the power transmission path 308 via at least one fourth switch SW4. The load dump arrangement 300 provides one load dump for both converter failures and grid failures. As compared to two separate load dumps for converter failures and grid failures, the single load dump may require a smaller space in the nacelle of the wind turbine. Thus, the weight and size of the nacelle may be reduced. For a wind turbine with a higher power rating, the space required for a single higher rated load dump is lesser than two load dumps.

Any suitable kinds of switches may be used as the plurality of first switches SW1, the plurality of second switches SW2, the plurality of third switches SW3 and the at least one fourth switch SW4. Some examples of the switches include but are not limited to breakers, contactors with or without a fuse and semiconductor power switches e.g. insulated-gate bipolar transistors (IGBT), metal oxide semiconductor field effect transistors (MOSFET), gate turn-off (GTO) thyristors and anti-parallel thyristors. In one embodiment, the plurality of first switches SW1 and the plurality of second switches SW2 may be breakers or contactors with or without a fuse. The plurality of third switches SW3 may be breaker, contactors with or without a fuse or semiconductor power switches e.g. insulated-gate bipolar transistors (IGBT), metal oxide semiconductor field effect transistors (MOSFET), gate turn-off (GTO) thyristors and anti-parallel thyristors. At least one fourth switch SW4 may be a semiconductor power switch e.g. an insulated-gate bipolar transistor, a metal oxide semiconductor field effect transistor (MOSFET), a gate turn-off (GTO) thyristor and an anti-parallel thyristor.

The wind turbine includes a controlling unit 316 configured to detect a converter failure or a grid failure, and to control the respective switches SW1-SW4. The controlling unit 316 includes a generator side converter controller 318 which controls the generator side converter 310 and a grid side converter controller 320 which controls the grid side converter 312. The generator side converter controller 318 and the grid side converter controller 320 may collectively be known as a power converter controller. The controlling unit 316 includes a first controller 322 which controls the plurality of first switches SW1 and the plurality of second switches SW2. The first controller 322 may be part of the power converter controller. The controlling unit 316 includes a second controller 324 which controls the plurality of third switches SW3. The second controller 324 may be a part of power converter controller and/or a safety programmable logic controller (PLC). The controlling unit 316 includes a third controller 326 which controls the at least one fourth switch SW4. The third controller 326 may be part of the power converter controller.

Under normal operating conditions of the wind turbine, the controlling unit 316 is configured to close the plurality of first switches SW1 and the plurality of second switches SW2 to connect the power transmission path 308 to the generator 304 and the power grid 306. The third switches SW3 and the fourth switch SW4 remain opened. Upon detection of a converter failure, the controlling unit 316 is configured to close the third switches SW3 to connect the at least one resistor of the load dump arrangement 300 to the output 302 of the generator 304. When the third switches SW3 are closed, the controlling unit 316 is configured to open the plurality of first switches SW1 to disconnect the power transmission path 308 from the generator 304. The same applies if no converter failure is detected but the converter is found to be non-operational. Upon detection of a grid failure, the controlling unit 316 is configured to close the fourth switch SW4 to connect the at least one resistor of the load dump arrangement 300 across the DC link 314 of the power transmission path 308. When there is a grid failure, active power cannot be fully or partially sent to the power grid 306. Such a grid condition is also known as a low voltage ride through (LVRT) condition.

Figure 4A:
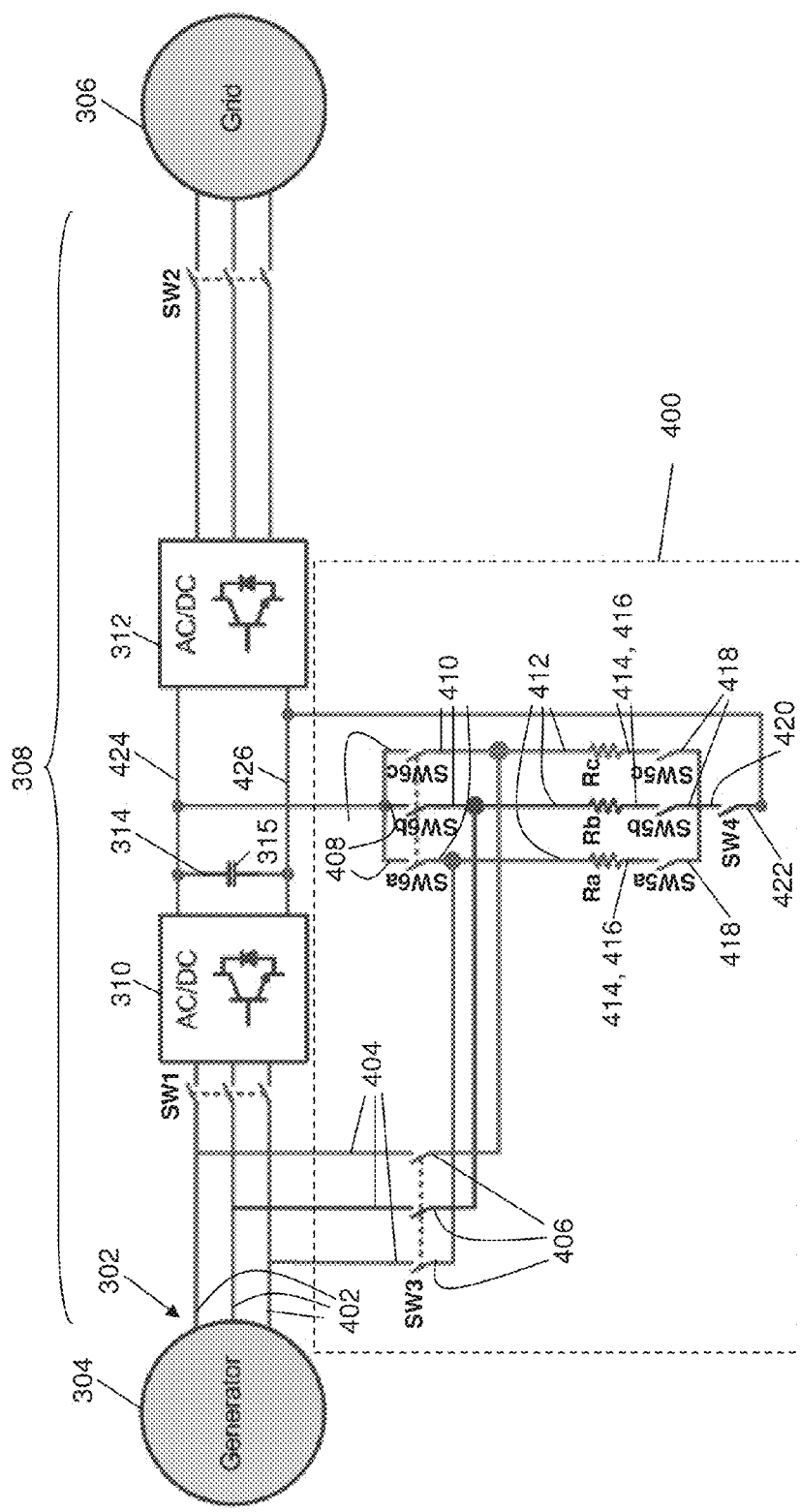
FIG. 4a shows a schematic drawing of a load dump arrangement usable in a wind turbine according to an embodiment of the present invention.

FIG. 4a shows one possible embodiment 400 of the load dump arrangement of FIG. 3. In this embodiment, the generator 304 has three output terminals 402. The load dump arrangement 400 includes three third switches SW3, a fourth switch SW4, three resistors (Ra, Rb, Rc), three fifth switches (SW5a, SW5b, SW5c) and three sixth switches (SW6a, SW6b, SW6c). Each third switch SW3 includes a first terminal 404 and a second terminal 406. Each resistor (Ra, Rb, Rc) includes a first terminal 412 and a second terminal 414. Each resistor (Ra, Rb, Rc) may be a single resistor or a resistor bank 504 shown in FIG. 6, which has a plurality of resistors 602 connected in parallel. The three resistors (Ra, Rb, Rc) may form a three-phase load dump. Each fifth switch SW5 includes a first terminal 416 and a second terminal 418. The fourth switch SW4 includes a first terminal 420 and a second terminal 422. Each sixth switch SW6 includes a first terminal 408 and a second terminal 410.

The first terminal 404 of each third switch SW3 is connected to a corresponding output terminal 402 of the generator 304, and the second terminal 406 of each third switch SW3 is connected to the second terminal of a corresponding sixth switch (SW6a, SW6b, SW6c) and the first terminal 412 of a corresponding resistor (Ra, Rb, Rc). The first terminal 408 of each sixth switch (SW6a, SW6b, SW6c) is connected to a first line 424 of the DC link 314. The second terminal 414 of each resistor (Ra, Rb, Rc) is connected to the first terminal 416 of a corresponding fifth switch (SW5a, SW5b, SW5c). The second terminal 418 of each fifth switch (SW5a, SW5b, SW5c) is connected to the first terminal 420 of the fourth switch SW4. The second terminal 422 of the fourth switch SW4 is connected to the second line 426 of the DC link 314.

Under normal operating conditions of the wind turbine, the plurality of first switches SW1 and the plurality of second switches SW2 are closed to connect the power transmission path 308 to the generator 304 and the power grid 306. The third switches SW3, the fourth switch SW4, the fifth switches (SW5a, SW5b, SW5c) and the sixth switches (SW6a, SW6b, SW6c) remain open.

Upon detection of a converter failure, one or more of the third switches SW3 and the fifth switches (SW5a, SW5b, SW5c) may be closed to connect the one or more resistors (Ra, Rb, Rc) of the load dump arrangement 400 to the output 302 of the generator 304. The plurality of first switches SW1 may be opened to disconnect the power transmission path 308 from the generator 304. The fourth switch SW4 and the sixth switches (SW6a, SW6b, SW6c) remain open. The same applies if no converter failure is detected but the converter is found to be non-operational. In the event of a converter failure or non-operational of the converter, no power is required to be sent to the power grid 306. Therefore, the full power from the generator is dissipated in the one or more resistors (Ra, Rb, Rc) of the load dump arrangement 400.

In one embodiment, the full power from the generator may be dissipated in a minimum of two resistors ((Ra, Rb, Rc) of the load dump arrangement 400. As such, two third switches SW3 and the two corresponding fifth switches (SW5a, SW5b, SW5c) may be closed to connect two resistors (Ra, Rb, Rc) of the load dump arrangement 400 to the output 302 of the generator 304.

Upon detection of a grid failure, one or more of the fourth switch SW4, the fifth switches (SW5a, SW5b, SW5c) and the sixth switches (SW6a, SW6b, SW6c) may be closed to connect the one or more resistors (Ra, Rb, Rc) of the load dump arrangement 400 across the DC link 314 of the power transmission path 308. The third switches SW3 remain open. Depending on the conditions of the grid failure, a partial of the generator output power or no generator output power is sent to the power grid. Therefore, a partial of the generator output power or the full generator output power is dissipated in the one or more resistors (Ra, Rb, Rc) of the load dump arrangement 400.

In one embodiment, a partial of the generator output power or the full generator output power may be dissipated in a minimum of one resistor (Ra, Rb, Rc) of the load dump arrangement 400. As such, one fifth switch (SW5a, SW5b, SW5c), the corresponding sixth switch (SW6a, SW6b, SW6c) and the fourth switch may be closed to connect one resistor (Ra, Rb, Rc) of the load dump arrangement 400 across the DC link 314 of the power transmission path 308.

Any suitable kinds of switches may be used as the plurality of first switches SW1, the plurality of second switches SW2, the third switches SW3, the fourth switch SW4, the fifth switches (SW5a, SW5b, SW5c) and the sixth switches (SW6a, SW6b, SW6c). Some examples of the switches include but are not limited to breakers, contactors with or without a fuse, semiconductor power switches e,g, insulated-gate bipolar transistors, metal oxide semiconductor field effect transistors (MOSFET), gate turn-off (GTO) thyristors and anti-parallel thyristors. In one embodiment, the plurality of first switches SW1, the plurality of second switches SW2 and the third switches SW3 may be breakers, contactors with or without a fuse or semiconductor power switches e,g, insulated-gate bipolar transistors, metal oxide semiconductor field effect transistors (MOSFET), gate turn-off (GTO) thyristors and anti-parallel thyristors. The fourth switch SW4, the fifth switches (SW5a, SW5b, SW5c) and the sixth switches (SW6a, SW6b, SW6c) may be semiconductor power switches e.g. insulated-gate bipolar transistors, metal oxide semiconductor field effect transistors (MOSFET), gate turn-off (GTO) thyristors and anti-parallel thyristors. The fourth switch SW4 is PWM controlled (e.g. controlled by a control signal from the controlling unit 316). The fifth switches (SW5a, SW5b, SW5c) may be controlled independently. At least two fifth switches (SW5a, SW5b, SW5c) need to be closed to transfer power from the generator to the load dump arrangement 400. That is, if one fifth switch (e.g. SW5a) is opened, the remaining fifth switches (e.g. SW5b, SW5c) are closed. The independent control of the fifth switches (SW5a, SW5b, SW5c) can increase the reliability of the load dump arrangement 400. For example, if one of the resistors (Ra, Rb, Rc) or electrical connections fails, the remaining two resistors (Ra, Rb, Rc) can dissipate the output power from the generator. In one embodiment, the three fifth switches (SW5a, SW5b, SW5c) may be omitted from the load dump arrangement 400. This will reduce the components count if desired so.

In an alternative embodiment, the plurality of first switches SW1 and the plurality of second switches SW2 may be breakers or contactors with or without a fuse. The third switches SW3, the fourth switch SW4, the fifth switches (SW5a, SW5b, SW5c) and the sixth switches (SW6a, SW6b, SW6c) may be semiconductor power switches e.g. insulated-gate bipolar transistors, metal oxide semiconductor field effect transistors (MOSFET), gate turn-off (GTO) thyristors and anti-parallel thyristors.

Figure 4B:
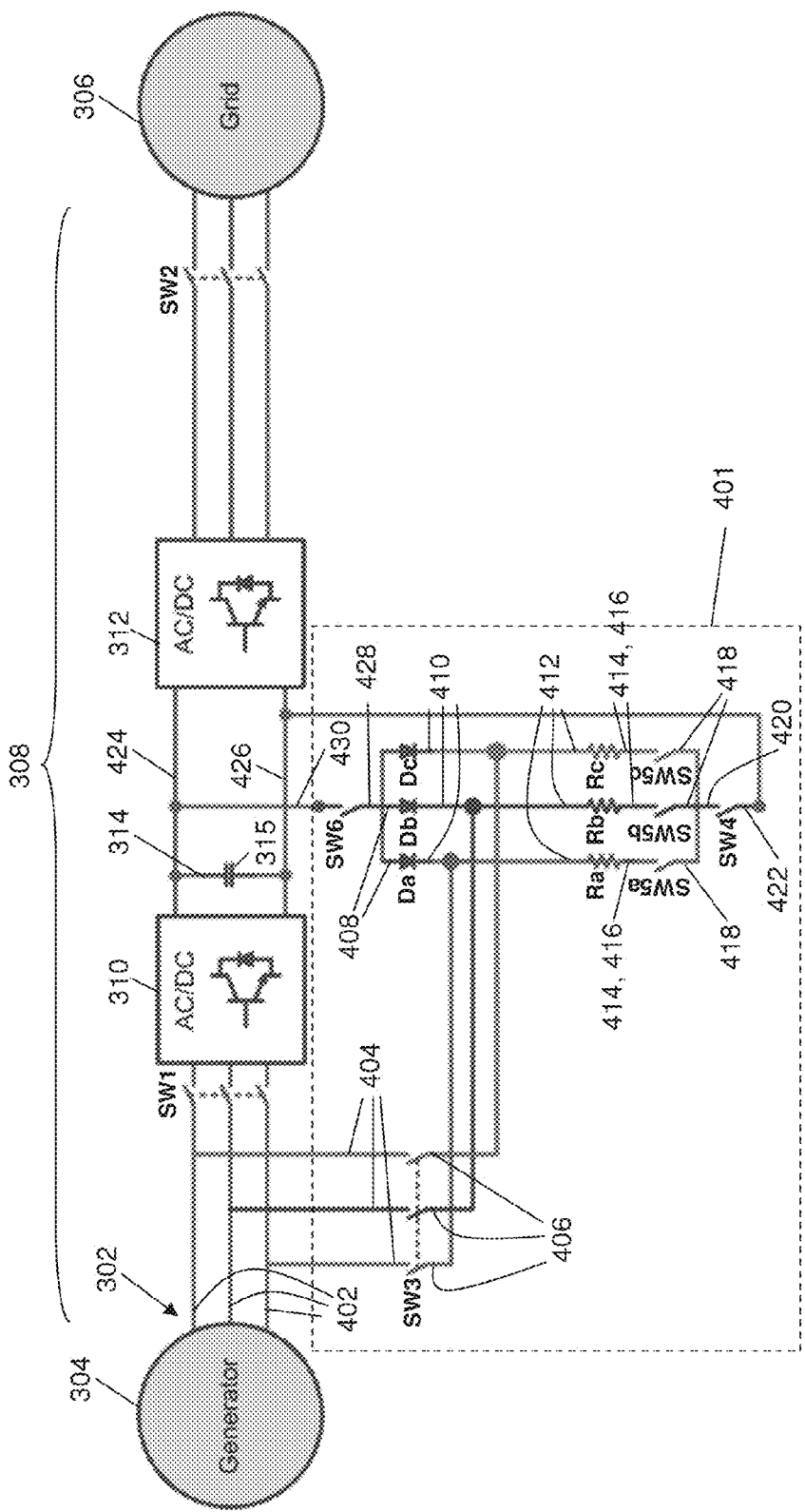
FIG. 4b shows a schematic drawing of a load dump arrangement usable in a wind turbine according to an embodiment of the present invention.

FIG. 4b shows another possible embodiment 401 of the load dump arrangement of FIG. 3. In this embodiment, the generator 304 has three output terminals 402. The load dump arrangement 401 includes three third switches SW3, a fourth switch SW4, three diodes (Da, Db, Dc), three resistors (Ra, Rb, Rc), three fifth switches (SW5a, SW5b, SW5c) and a sixth switch SW6. Each third switch SW3 includes a first terminal 404 and a second terminal 406. Each diode (Da, Db, Dc) includes a anode 408 and a cathode 410. Each resistor (Ra, Rb, Rc) includes a first terminal 412 and a second terminal 414. Each resistor (Ra, Rb, Rc) may be a single resistor or a resistor bank 504 shown in FIG. 6, which has a plurality of resistors 602 connected in parallel. The three resistors (Ra, Rb, Rc) may form a three-phase load dump. Each fifth switch SW5 includes a first terminal 416 and a second terminal 418. The fourth switch SW4 includes a first terminal 420 and a second terminal 422. The sixth switch SW6 includes a first terminal 428 and a second terminal 430.

The first terminal 404 of each third switch SW3 is connected to a corresponding output terminal 402 of the generator 304, and the second terminal 406 of each third switch SW3 is connected to the cathode 410 of a corresponding diode (Da, Db, Dc). The anode 408 of each diode (Da, Db, Dc) is connected to the first terminal 428 of the sixth switch SW6. The second terminal 430 of the sixth switch SW6 is connected to a first line 424 of the DC link 314. The cathode 410 of each diode (Da, Db, Dc) is further connected to the first terminal 412 of a corresponding resistor (Ra, Rb, Rc). The second terminal 414 of each resistor (Ra, Rb, Rc) is connected to the first terminal 416 of a corresponding fifth switch (SW5a, SW5b, SW5c). The second terminal 418 of each fifth switch (SW5a, SW5b, SW5c) is connected to the first terminal 420 of the fourth switch SW4. The second terminal 422 of the fourth switch SW4 is electrically connected to the second line 426 of the DC link 314.

Under normal operating conditions of the wind turbine, the plurality of first switches SW1 and the plurality of second switches SW2 are closed to connect the power transmission path 308 to the generator 304 and the power grid 306. The third switches SW3, the fourth switch SW4, the fifth switches (SW5a, SW5b, SW5c) and the sixth switch SW6 remain open.

Upon detection of a converter failure, one or more of the third switches SW3 and the fifth switches (SW5a, SW5b, SW5c) may be closed to connect the one or more resistors (Ra, Rb, Rc) of the load dump arrangement 401 to the output 302 of the generator 304. The plurality of first switches SW1 may be opened to disconnect the power transmission path 308 from the generator 304. The fourth switch SW4 and the sixth switch SW6 remain open. The same applies if no converter failure is detected but the converter is found to be non-operational. In the event of a converter failure or non-operational of the converter, no power is required to be sent to the power grid 306. Therefore, the full power from the generator is dissipated in the one or more resistors (Ra, Rb, Rc) of the load dump arrangement 401.

In one embodiment, the full power from the generator may be dissipated in a minimum of two resistors ((Ra, Rb, Rc) of the load dump arrangement 401. As such, two third switches SW3 and the two corresponding fifth switches (SW5a, SW5b, SW5c) may be closed to connect two resistors (Ra, Rb, Rc) of the load dump arrangement 401 to the output 302 of the generator 304.

Upon detection of a grid failure, one or more of the fourth switch SW4, the fifth switches (SW5a, SW5b, SW5c) and the sixth switch SW6 may be closed to connect the one or more resistors (Ra, Rb, Rc) of the load dump arrangement 401 across the DC link 314 of the power transmission path 308. The third switches SW3 remain open. Depending on the conditions of the grid failure, a partial of the generator output power or no generator output power is sent to the power grid. Therefore, a partial of the generator output power or the full generator output power is dissipated in the one or more resistors (Ra, Rb, Rc) of the load dump arrangement 401. The three diodes (Da, Db, Dc) ensure that the partial or full generator output power is sent from the first line 424 of the DC link 314 to the one or more resistors (Ra, Rb, Rc) of the load dump arrangement 401.

In one embodiment, a partial of the generator output power or the full generator output power may be dissipated in a minimum of one resistor (Ra, Rb, Rc) of the load dump arrangement 401. As such, one fifth switch (SW5a, SW5b, SW5c) and the fourth switch may be closed to connect one resistor (Ra, Rb, Rc) of the load dump arrangement 401 across the DC link 314 of the power transmission path 308.

Any suitable kinds of switches may be used as the plurality of first switches SW1, the plurality of second switches SW2, the third switches SW3, the fourth switch SW4, the fifth switches (SW5a, SW5b, SW5c) and the sixth switch SW6. Some examples of the switches include but are not limited to breakers, contactors with or without a fuse, semiconductor power switches e.g. insulated-gate bipolar transistors, metal oxide semiconductor field effect transistors (MOSFET), gate turn-off (GTO) thyristors and anti-parallel thyristors. In one embodiment, the plurality of first switches SW1, the plurality of second switches SW2 and the third switches SW3 may be breakers or contactors with or without a fuse. The fourth switch SW4, the fifth switches (SW5a, SW5b, SW5c) and the sixth switch SW6 may be semiconductor power switches e.g. insulated-gate bipolar transistors, metal oxide semiconductor field effect transistors (MOSFET), gate turn-off (GTO) thyristors and anti-parallel thyristors. The fourth switch SW4 is PWM controlled (e.g. controlled by a control signal from the controlling unit 316). The fifth switches (SW5a, SW5b, SW5c) may be controlled independently. At least two fifth switches (SW5a, SW5b, SW5c) need to be closed to transfer power from the generator to the load dump arrangement 400. That is, if one fifth switch (e.g. SW5a) is opened, the remaining fifth switches (e.g. SW5b, SW5c) are closed. The independent control of the fifth switches (SW5a, SW5b, SW5c) can increase the reliability of the load dump arrangement 401. For example, if one of the resistors (Ra, Rb, Rc) or electrical connections fails, the remaining two resistors (Ra, Rb, Rc) can dissipate the output power from the generator. In one embodiment, the three fifth switches (SW5a, SW5b, SW5c) may be omitted from the load dump arrangement 400. This will reduce the components count if desired so.

In an alternative embodiment, the plurality of first switches SW1 and the plurality of second switches SW2 may be breakers or contactors with or without a fuse. The third switches SW3, the fourth switch SW4, the fifth switches (SW5a, SW5b, SW5c) and the sixth switch SW6 may be semiconductor power switches e.g. insulated-gate bipolar transistors, metal oxide semiconductor field effect transistors (MOSFET), gate turn-off (GTO) thyristors and anti-parallel thyristors.

Figure 5A:
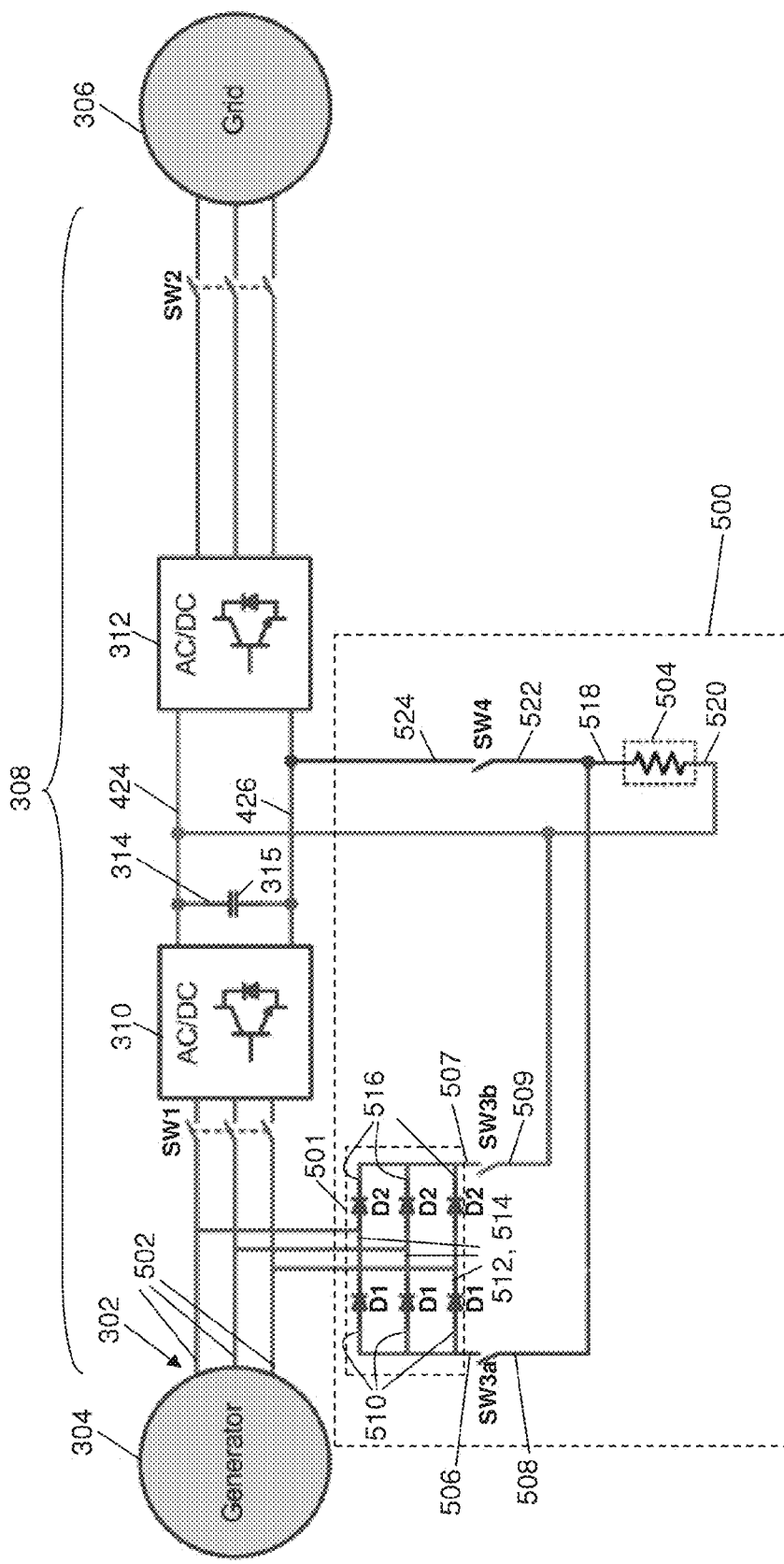
FIG. 5a shows a schematic drawing of a load dump arrangement usable in a wind turbine according to an embodiment of the present invention.
Figure 6:
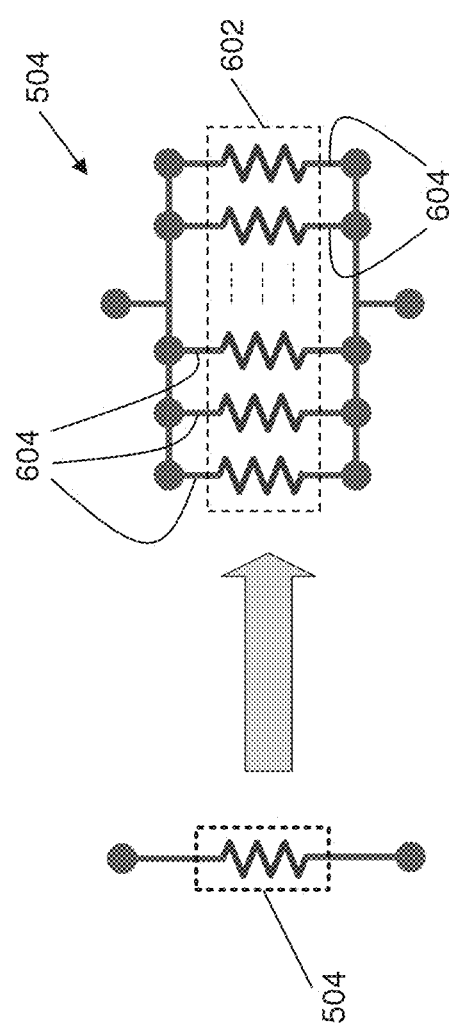
FIG. 6 shows a schematic drawing of a resistor bank usable in a wind turbine according to an embodiment of the present invention.

FIG. 5a shows another possible embodiment 500 of the load dump arrangement of FIG. 3. In this embodiment, the generator 304 has three output terminals 502. The load dump arrangement 500 comprises a first third switch SW3a, a second third switch SW3b, a three phase bridge rectifier 501, a resistor bank 504 and a fourth switch SW4. In one embodiment, the three phase bridge rectifier 501 has three first diodes D1 and three second diodes D2. The first third switch SW3a includes a first terminal 506 and a second terminal 508. The second third switch SW3b includes a first terminal 507 and a second terminal 509. Each first diode D1 includes an anode 510 and a cathode 512. Each second diode D2 includes an anode 514 and a cathode 516. The three first diodes D1 and the three second diodes D2 may be a rectifier bridge. The resistor bank 504 has a first terminal 518 and a second terminal 520. As shown in FIG. 6, the resistor bank 504 has a plurality of resistors 602 connected in parallel. There may be a fuse (not shown) and/or a switch (not shown) connected in series with the resistor 602 in each parallel branch 604 of the resistor bank 504. The fourth switch SW4 has a first terminal 522 and a second terminal 524. Alternatively, the resistor bank 504 may be used in place of every resistor shown in all the figures.

The cathode 512 of each first diode D1 is connected to the anode 514 of a corresponding second diode D2 and a corresponding output terminal 502 of the generator 304. The anodes 510 of the three first diodes D1 are connected together, and the cathodes 516 of the three second diodes D2 are connected together. The first terminal 506 of the first third switch SW3a is connected to the anodes 510 of the three first diodes D1, and the second terminal 508 of the first third switch SW3a is connected to the first terminal 518 of the resistor bank 504. The first terminal 507 of the second third switch SW3b is connected to the cathodes 516 of the three first diodes D1, and the second terminal 509 of the second third switch SW3b is connected to the second terminal 520 of the resistor bank 504 and the first line 424 of the DC link 314. The first terminal 518 of the resistor bank 504 is further connected to the first terminal 522 of the fourth switch SW4. The second terminal 524 of the fourth switch SW4 is connected to the second line 426 of the DC link 314.

Under normal operating conditions of the wind turbine, the plurality of first switches SW1 and the plurality of second switches SW2 are closed to connect the power transmission path 308 to the generator 304 and the power grid 306. The first third switch SW3a, the second third switch SW3b and the fourth switch SW4 remain open.

Upon detection of a converter failure, the first third switch SW3a and the second third switch SW3b may be closed to connect the resistor bank 504 of the load dump arrangement 500 to the output 302 of the generator 304. The plurality of first switches SW1 may be opened to disconnect the power transmission path 308 from the generator 304. The fourth switch SW4 remains open. The same applies if no converter failure is detected but the converter is found to be non-operational. In the event of a converter failure or non-operational of the converter, no power is required to be sent to the power grid 306. Therefore, the full power from the generator is dissipated in the resistor bank 504 of the load dump arrangement 500.

Upon detection of a grid failure, the fourth switch SW4 may be closed to connect the resistor bank 504 of the load dump arrangement 500 across the DC link 314 of the power transmission path 308. The first third switch SW3a and the second third switch SW3b remain open. Depending on the conditions of the grid failure, a partial of the generator output power or no generator output power is sent to the power grid. Therefore, a partial of the generator output power or the full generator output power is dissipated in the resistor bank of the load dump arrangement 500.

Any suitable kinds of switches may be used as the plurality of first switches SW1, the plurality of second switches SW2, the first third switch SW3a, the second third switch SW3b and the fourth switch SW4. Some examples of the switches include but are not limited to breakers, contactors with or without a fuse, semiconductor power switches e.g. insulated-gate bipolar transistors, metal oxide semiconductor field effect transistors (MOSFET), gate turn-off (GTO) thyristors and anti-parallel thyristors. In one embodiment, the plurality of first switches SW1 and the plurality of second switches SW2 may be breakers or contactors with or without a fuse. The first third switch SW3a, the second third switch SW3b and the fourth switch SW4 may be semiconductor power switches e.g. insulated-gate bipolar transistors, metal oxide semiconductor field effect transistors (MOSFET), gate turn-off (GTO) thyristors and anti-parallel thyristors. The switches SW3a or SW3b and SW4 are PWM controlled (e.g. controlled by a control signal from the controlling unit 316).

In an alternative embodiment, an active converter may be used in placed of the three phase bridge rectifier 501 of the load dump arrangement 500.

Figure 5D:
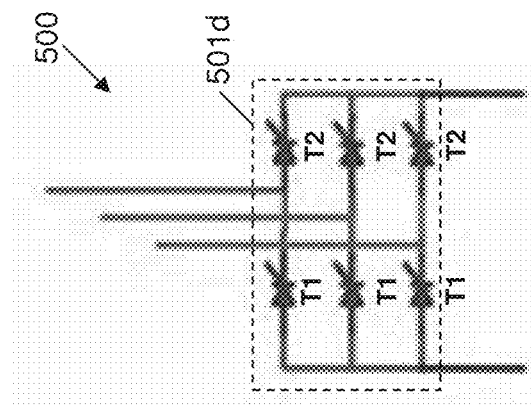
Figure 5C:
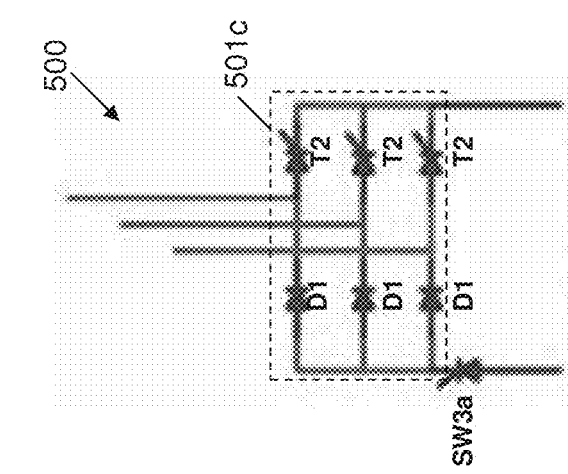
Figure 5B:
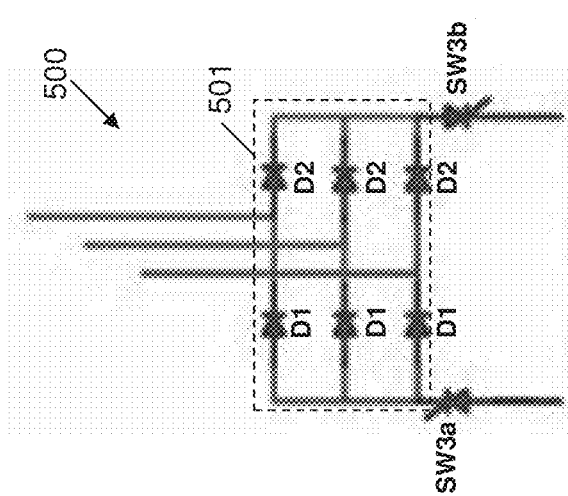

In one embodiment, as shown in FIG. 5b, the load dump arrangement 500 may include the three phase bridge rectifier 501 having three first diodes D1 and three second diodes D2. The load dump arrangement 500 may use thyristors as the third switches SW3a, SW3b.

In another embodiment, as shown in FIG. 5c, the load dump arrangement 500 may include a half silicon-controlled rectifier (SCR) bridge 501c having three first diodes D1 and three thyristors T2. The load dump arrangement 500 may have a thyristor as the third switch SW3a.

In yet another embodiment, as shown in FIG. 5d, the load dump arrangement 500 may include a full silicon-controlled rectifier (SCR) bridge 501d having three first thyristors T1 and three second thyristors T2. The load dump arrangement 500 may not have any third switches SW3a, SW3b.

Alternatively, power semiconductor switches e.g. insulated-gate bipolar transistors can be used in place of silicon-controlled rectifier (SCR) bridge and thyristors shown in FIGS. 5b to 5d.

Figure 7:
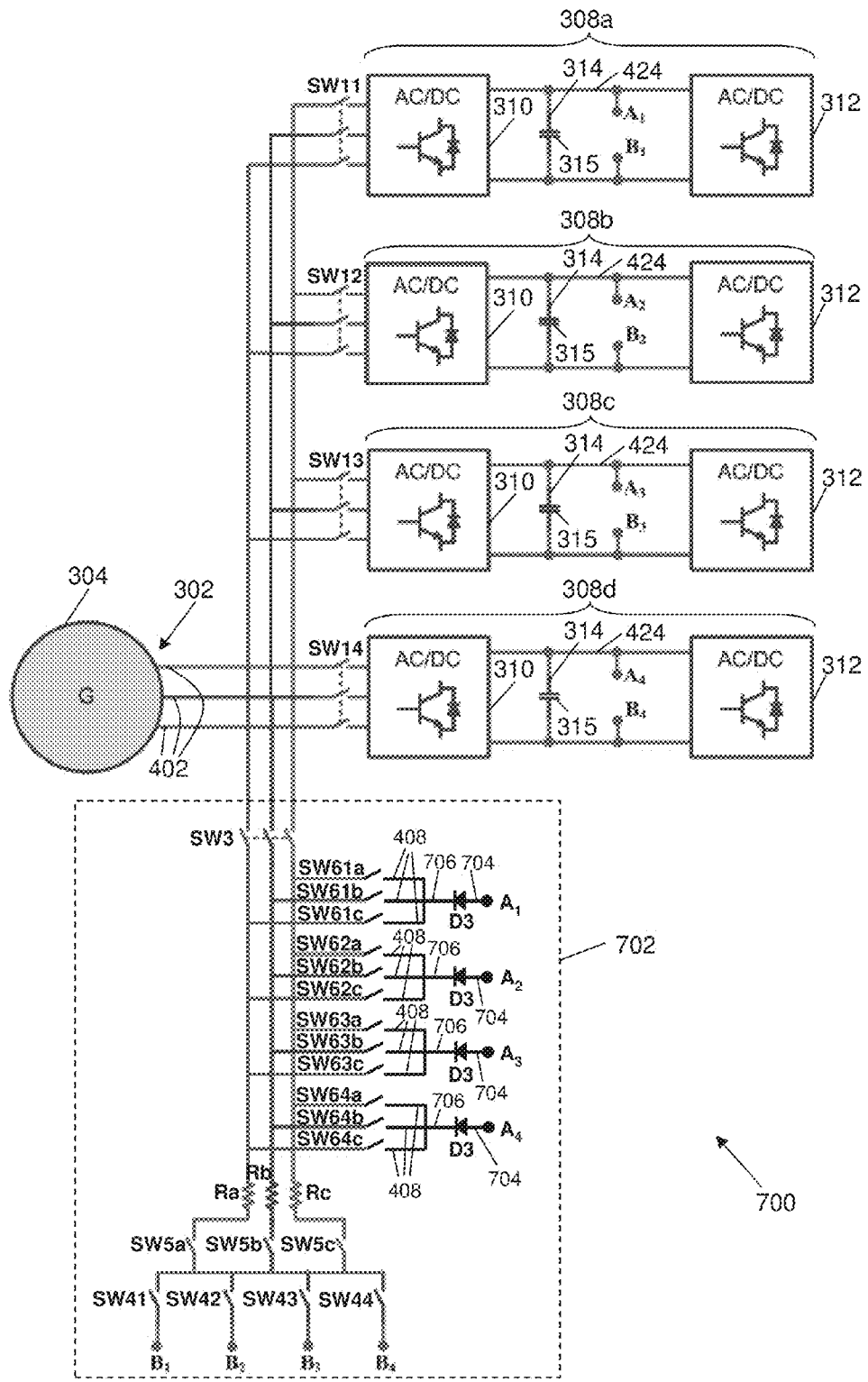
FIG. 7 shows a schematic drawing of the load dump arrangement of FIG. 4a usable in a wind turbine having a plurality of power transmission paths according to an embodiment of the present invention.

FIG. 7 shows one possible embodiment 702 of the load dump arrangement of FIG. 4a usable in one embodiment of the wind turbine 700. The wind turbine 700 differs from the wind turbine of FIG. 4a in that the wind turbine 700 includes a plurality of power transmission paths 308 (e.g. four power transmission paths 308a-d) instead of a single power transmission path 308a-d. Similarly, the generator 304 has three output terminals 402. Each power transmission path 308a-d is connected to the three output terminals 402. Each power transmission path 308a-d connects the output 302 of the generator 304 to the power grid 306. Each power transmission path 308a-d includes a generator side converter 310 coupled to the output 302 of the generator 304, a grid side converter 312 coupled to the power grid 306, and a DC link 314 having a DC link capacitor 315 coupled between the generator side converter 310 and the grid side converter 312. Each power transmission path 308a-d is connectable to the generator 304 via a corresponding plurality of first switches (SW11, SW12, SW13, SW14) and is connectable to the power grid 306 via a corresponding plurality of second switches (not shown).

The four power transmission paths 308a-d are coupled to the same load dump arrangement 702. The electrical connections of the load dump arrangement 702 electrically connect the one or more resistors (Ra, Rb, Rc) to the output 302 of the generator 304 and to each of the plurality of DC links 314 via the plurality of switches. The load dump arrangement 702 includes a corresponding fourth switch (SW41, SW42, SW43, SW44) and corresponding sixth switches (SW61a-SW61c, SW62a-SW62c, SW63a-SW63c, SW64a-SW64c) for each power transmission path 308a-d. The load dump arrangement 702 is connectable across the DC link 314 of each power transmission path 308a-d via the corresponding fourth switch (SW41, SW42, SW43, SW44) and the corresponding sixth switches (SW61a-c, SW62a-c, SW63a-c, SW64a-c).

The load dump arrangement 702 is different from the load dump arrangement 400 of FIG. 4a in that the load dump arrangement 702 further includes a corresponding third diode D3 for each power transmission path 308a-d. Each third diode D3 has an anode 704 and a cathode 706. The anode 704 of each third diode D3 is connected to the first line 424 of the DC link 314 of the corresponding power transmission path 308a-d. The cathode 706 of each third diode D3 is connected to the first terminals 509 of the corresponding sixth switches (SW61a-SW61c, SW62a-SW62c, SW63a-SW63c, SW64a-SW64c). As the four power transmission paths 308a-d share the same load dump arrangement 702, the third diodes D3 are provided in the load dump arrangement 702 to avoid interaction among the DC links 314 when dissipating power in the load dump arrangement 702.

Upon detection of a converter failure in one or more of the plurality of power transmission paths 308a-d, the controlling unit 316 is configured to close one or more of the third switches SW3 and the fifth switches (SW5a, SW5b, SW5c) to connect the one or more resistors (Ra, Rb, Rc) of the load dump arrangement 702 to the output 302 of the generator 304. The corresponding plurality of first switches (SW11, SW12, SW13, SW14) may be opened to disconnect the one or more of the plurality of power transmission paths 308a-d from the generator 304. The fourth switches (SW41, SW42, SW43, SW44) and the sixth switches (SW61a-c, SW62a-c, SW63a-c, SW64a-c) remain open. For example, if a converter failure is detected in the first power transmission path 308a, the third switches SW3 and one or more of the fifth switches (SW5a, SW5b, SW5c) may be closed to connect the one or more resistors (Ra, Rb, Rc) of the load dump arrangement 702 to the output 302 of the generator 304. The corresponding plurality of first switches SW11 may be opened to disconnect the first power transmission path 308a from the generator 304. The remaining plurality of first switches (SW12, SW13, SW14) may remain closed. The same applies if a converter failure is detected in the other transmission paths 308b-d and/or two or more of the four transmission paths 308a-d. The same applies if no converter failure is detected but the converter in one or more of the four transmission paths 308a-d is found to be non-operational.

Upon detection of a grid failure, the controlling unit 316 is configured to close one or more of the corresponding fourth switch (SW41, SW42, SW43, SW44), the corresponding sixth switches (SW61a-c, SW62a-c, SW63a-c, SW64a-c) and the fifth switches (SW5a, SW5b, SW5c) to connect the one or more resistors (Ra, Rb, Rc) of the load dump arrangement 702 across the corresponding DC link 314 of the one or more of the plurality of power transmission paths 308a-d. The third switches SW3 remain open. For example, if the converters 310, 312 of the first power transmission path 308a are operating and a grid failure is detected, the corresponding fourth switch SW41 and the fifth switches (SW5a, SW5b, SW5c) and the corresponding sixth switches SW61a-c may be closed to connect the one or more resistors (Ra, Rb, Rc) of the load dump arrangement 702 across the corresponding DC link 314 of the first power transmission path 308a. Similarly, the corresponding fourth switches SW42-SW44 and the corresponding sixth switches (SW62a-c, SW63a-c, SW64a-c) may be closed if the converters 310, 312 of one or more of the other power transmission paths 308b-d are operating when a grid failure is detected.

Figure 8:
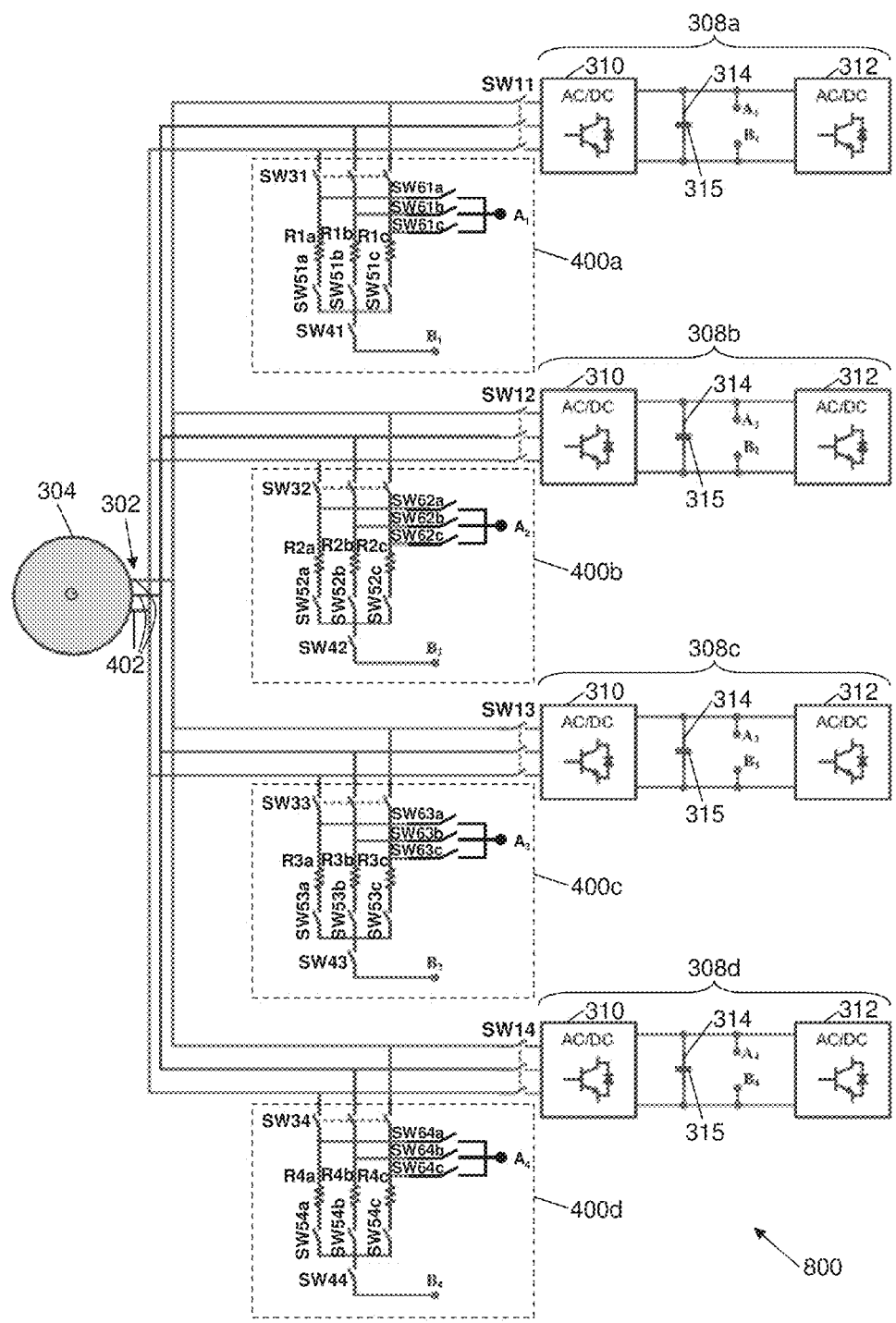
FIG. 8 shows a schematic drawing of a plurality of the load dump arrangements of FIG. 4a usable in a wind turbine having a plurality of power transmission paths according to an embodiment of the present invention.

FIG. 8 shows the load dump arrangement 400 of FIG. 4a usable in one embodiment 800 of the wind turbine of FIG. 7. Similar to the wind turbine 700 of FIG. 7, the wind turbine 800 includes a plurality of power transmission paths 308 (e.g. four power transmission paths 308a-d) instead of a single power transmission path 308. The generator 304 has three output terminals 402. Each power transmission path 308a-d is connected to the three output terminals 402.

However, the four power transmission paths 308a-d of the wind turbine 800 are not coupled to the same load dump arrangement. Each of the four power transmission paths 308a-d of the wind turbine 800 is coupled to a corresponding load dump arrangement 400a-d.

Thus, upon detection of a converter failure in one or more of the plurality of power transmission paths 308a-d, the controlling unit 316 is configured to close one or more of the corresponding third switches (SW31, SW32, SW33, SW34) and the corresponding fifth switches (SW51a-c, SW52a-c, SW53a-c, SW54a-c) to connect the at least one resistor (R1a-c, R2a-c, R3a-c, R4a-c) of one or more of the corresponding load dump arrangements 400a-d to the output 302 of the generator 304. One or more of the corresponding plurality of first switches (SW11, SW12, SW13, SW14) may be opened to disconnect the one or more of the plurality of power transmission paths 308a-d from the generator 304. The fourth switches (SW41, SW42, SW43, SW44) and the sixth switches (SW61a-c, SW62a-c, SW63a-c, SW64a-c) remain open. For example, if a converter failure is detected in the first power transmission path 308a, the corresponding third switches SW31 and the corresponding fifth switches SW51a-c may be closed to connect the resistors R1a-c of the corresponding load dump arrangement 400a to the output 302 of the generator 304. The corresponding plurality of first switches SW11 may be opened to disconnect the first power transmission path 308a from the generator. Similarly, the corresponding third switches SW32-SW34 and the corresponding fifth switches (SW52a-c, SW53a-c, SW54a-c) may be closed if a converter failure is detected in the other transmission paths 308b-d and/or two or more of the four transmission paths 308a-d. The same applies if no converter failure is detected but the converter in one or more of the four transmission paths 308a-d is found to be non-operational.

Upon detection of a grid failure, the controlling unit 316 is configured to close one or more of the corresponding fourth switch (SW41, SW42, SW43, SW44), the corresponding fifth switches (SW51a-c, SW52a-c, SW53a-c, SW54a-c) and the corresponding sixth switches (SW61a-c, SW62a-c, SW63a-c, SW64a-c) to connect the at least one resistor (R1a-c, R2a-c, R3a-c, R4a-c) of one or more of the corresponding load dump arrangements 400a-d across the corresponding DC link 314 of the one or more of the plurality of power transmission paths 308a-d. The third switches (SW31, SW32, SW33, SW34) remain open. For example, if the converters 310, 312 of the first power transmission path 308a are operating and a grid failure is detected, the corresponding fourth switch SW41 and the corresponding fifth switches SW51a-c may be closed to connect the one or more resistors R1a-c of the corresponding load dump arrangement 400a across the corresponding DC link 314 of the first power transmission path 308a. Similarly, the corresponding fourth switches SW42-SW44, the corresponding fifth switches (SW52a-c, SW53a-c, SW54a-c) and the corresponding sixth switches (SW62a-c, SW63a-c, SW64a-c) may be closed if the converters 310, 312 of one or more of the other power transmission paths 308b-d are operating when a grid failure is detected.

Figure 9:
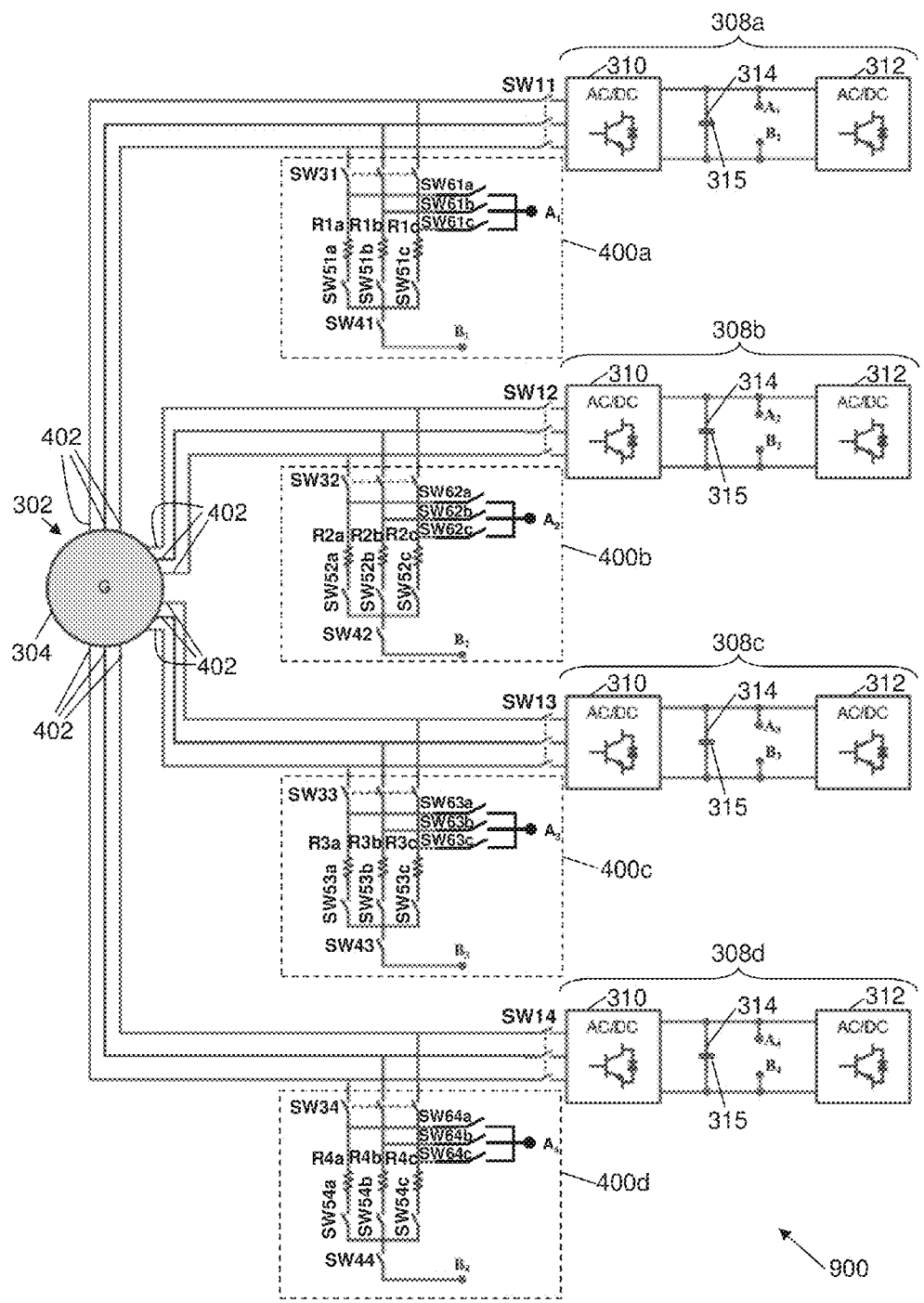
FIG. 9 shows a schematic drawing of a plurality of the load dump arrangements of FIG. 4a usable in a wind turbine having a plurality of power transmission paths according to an embodiment of the present invention.

FIG. 9 shows the load dump arrangement 400 of FIG. 4a usable in one possible embodiment 900 of the wind turbine of FIG. 8. Similar to the wind turbine 800 of FIG. 8, the wind turbine 900 includes a plurality of power transmission paths 308 (e.g. four power transmission paths 308a-d) instead of a single power transmission path 308. Each of the four power transmission paths 308a-d of the wind turbine 800 is coupled to a corresponding load dump arrangement 400a-d. However, the generator 304 has four sets of three-phase AC output terminals 402. Each power transmission path 308a-d is connected to the corresponding three output terminals 402 of the generator 304. In this embodiment, the generator 304 may be a segmented generator. The operation of the load dump arrangement 400a-d for each power transmission path 308a-d is the same as that described above for FIG. 8. In one embodiment, the load dump arrangement 400a-d can be applied to a segmented generator having more than four sets of three-phase AC output terminals 402.

Figure 10:
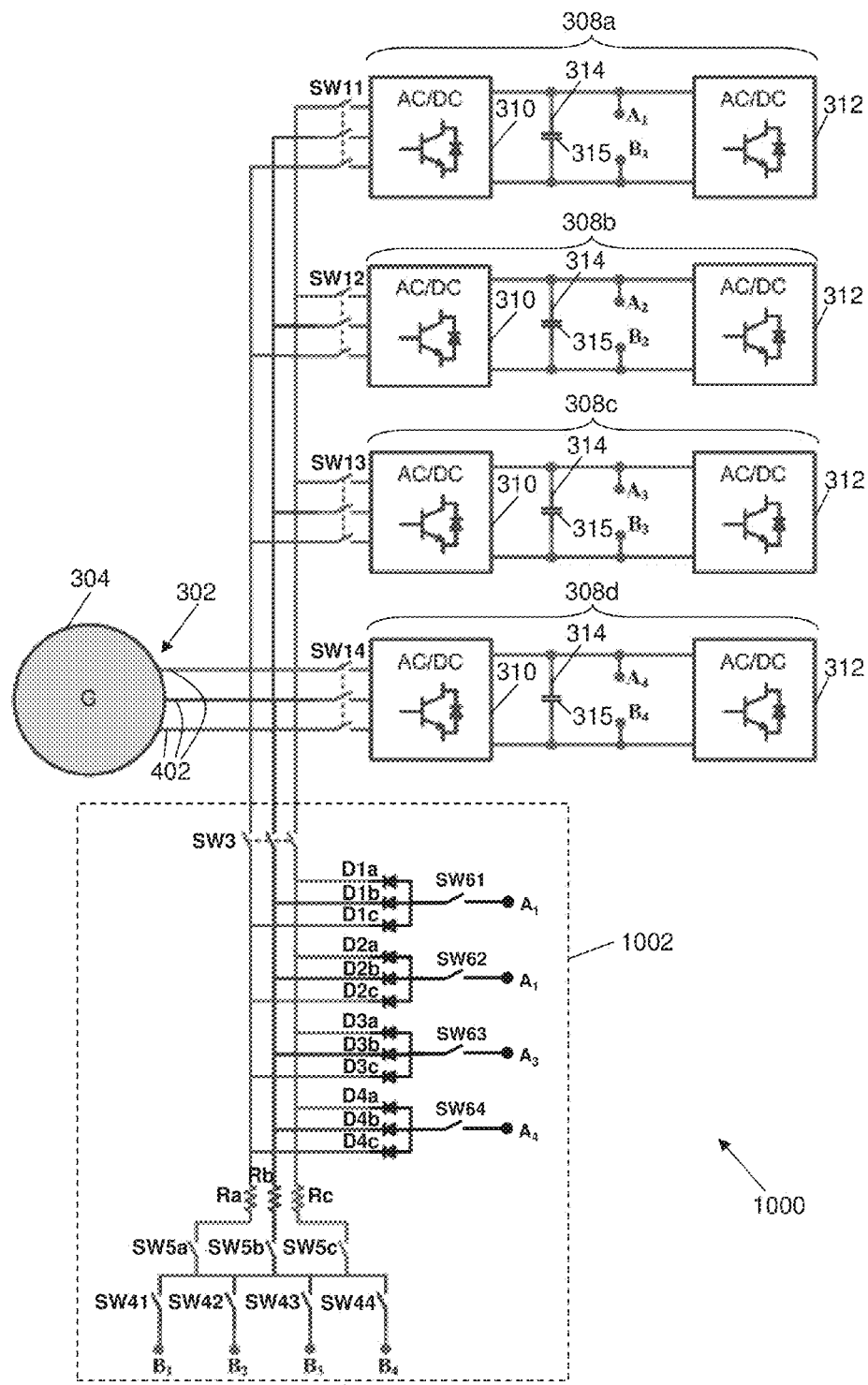
FIG. 10 shows a schematic drawing of the load dump arrangement of FIG. 4b usable in a wind turbine having a plurality of power transmission paths according to an embodiment of the present invention.

FIG. 10 shows one possible embodiment 1002 of the load dump arrangement of FIG. 4b usable in one embodiment of the wind turbine 1000. The wind turbine 1000 differs from the wind turbine of FIG. 4b in that the wind turbine 1000 includes a plurality of power transmission paths 308 (e.g. four power transmission paths 308a-d) instead of a single power transmission path 308a-d. Similarly, the generator 304 has three output terminals 402. Each power transmission path 308a-d is connected to the three output terminals 402. Each power transmission path 308a-d connects the output 302 of the generator 304 to the power grid 306. Each power transmission path 308a-d includes a generator side converter 310 coupled to the output 302 of the generator 304, a grid side converter 312 coupled to the power grid 306, and a DC link 314 coupled between the generator side converter 310 and the grid side converter 312. Each power transmission path 308a-d is connectable to the generator 304 via a corresponding plurality of first switches (SW11, SW12, SW13, SW14) and is connectable to the power grid 306 via a corresponding plurality of second switches (not shown).

The four power transmission paths 308a-d are coupled to the same load dump arrangement 1002. The electrical connections of the load dump arrangement 1002 electrically connect the one or more resistors (Ra, Rb, Rc) to the output 302 of the generator 304 and to each of the plurality of DC links 314 via the plurality of switches. The load dump arrangement 1002 includes a corresponding fourth switch (SW41, SW42, SW43, SW44), a corresponding sixth switch (SW61, SW62, SW63, SW64) and corresponding three diodes (D1a-D1c, D2a-D2c, D3a-D3c, D4a-D4c) for each power transmission path 308a-d. The load dump arrangement 1002 is connectable across the DC link 314 of each power transmission path 308a-d via the corresponding fourth switch (SW41, SW42, SW43, SW44) and a corresponding sixth switch (SW61, SW62, SW63, SW64).

Upon detection of a converter failure in one or more of the plurality of power transmission paths 308a-d, the controlling unit 316 is configured to close one or more of the third switches SW3 and the fifth switches (SW5a, SW5b, SW5c) to connect the one or more resistors (Ra, Rb, Rc) of the load dump arrangement 1002 to the output 302 of the generator 304. The corresponding plurality of first switches (SW11, SW12, SW13, SW14) may be opened to disconnect the one or more of the plurality of power transmission paths 308a-d from the generator 304. The fourth switches (SW41, SW42, SW43, SW44) and the sixth switches (SW61, SW62, SW63, SW64) remain open. For example, if a converter failure is detected in the first power transmission path 308a, the third switches SW3 and the fifth switches (SW5a, SW5b, SW5c) may be closed to connect the one or more resistors (Ra, Rb, Rc) of the load dump arrangement 1002 to the output 302 of the generator 304. The corresponding plurality of first switches SW11 may be opened to disconnect the first power transmission path 308a from the generator 304. The remaining plurality of first switches (SW12, SW13, SW14) may remain closed. The same applies if a converter failure is detected in the other transmission paths 308b-d and/or two or more of the four transmission paths 308a-d. The same applies if no converter failure is detected but the converter in one or more of the four transmission paths 308a-d is found to be non-operational.

Upon detection of a grid failure, the controlling unit 316 is configured to close one or more of the corresponding fourth switch (SW41, SW42, SW43, SW44), the corresponding sixth switch (SW61, SW62, SW63, SW64) and the fifth switches (SW5a, SW5b, SW5c) to connect the one or more resistors (Ra, Rb, Rc) of the load dump arrangement 1002 across the corresponding DC link 314 of the one or more of the plurality of power transmission paths 308a-d. The third switches SW3 remain open. For example, if the converters 310, 312 of the first power transmission path 308a are operating and a grid failure is detected, the corresponding fourth switch SW41, the corresponding sixth switch SW61 and the fifth switches (SW5a, SW5b, SW5c) may be closed to connect the one or more resistor (Ra, Rb, Rc) of the load dump arrangement 1002 across the corresponding DC link 314 of the first power transmission path 308a. Similarly, the corresponding fourth switches SW42-SW44 and the corresponding sixth switches SW62-SW64 may be closed if the converters 310, 312 of one or more of the other power transmission paths 308b-d are operating when a grid failure is detected.

Figure 11:
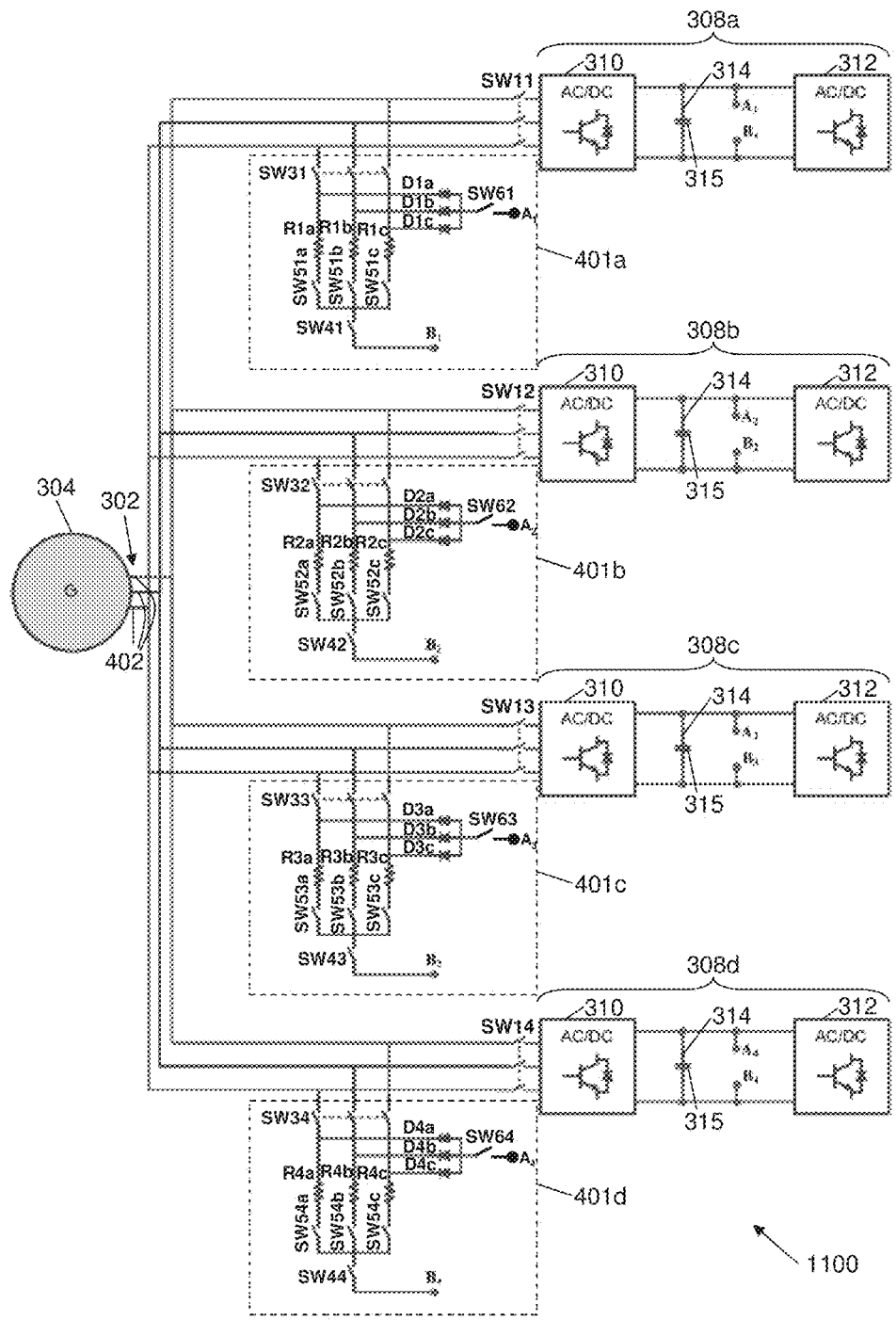
FIG. 11 shows a schematic drawing of a plurality of the load dump arrangements of FIG. 4b usable in a wind turbine having a plurality of power transmission paths according to an embodiment of the present invention.

FIG. 11 shows the load dump arrangement 401 of FIG. 4b usable in one embodiment 1100 of the wind turbine of FIG. 10. Similar to the wind turbine 1000 of FIG. 10, the wind turbine 1100 includes a plurality of power transmission paths 308 (e.g. four power transmission paths 308a-d) instead of a single power transmission path 308. The generator 304 has three output terminals 402. Each power transmission path 308a-d is connected to the three output terminals 402.

However, the four power transmission paths 308a-d of the wind turbine 1100 are not coupled to the same load dump arrangement. Each of the four power transmission paths 308a-d of the wind turbine 1100 is coupled to a corresponding load dump arrangement 401 a-d.

Thus, upon detection of a converter failure in one or more of the plurality of power transmission paths 308a-d, the controlling unit 316 is configured to close one or more of the corresponding third switches (SW31, SW32, SW33, SW34) and the corresponding fifth switches (SW51a-c, SW52a-c, SW53a-c, SW54a-c) to connect the at least one resistor (R1a-c, R2a-c, R3a-c, R4a-c) of one or more of the corresponding load dump arrangements 401a-d to the output 302 of the generator 304. One or more of the corresponding plurality of first switches (SW11, SW12, SW13, SW14) may be opened to disconnect the one or more of the plurality of power transmission paths 308a-d from the generator 304. The fourth switches (SW41, SW42, SW43, SW44) and the sixth switches (SW61, SW62, SW63, SW64) remain open. For example, if a converter failure is detected in the first power transmission path 308a, the corresponding third switch SW31 and the corresponding fifth switches SW51a-c may be closed to connect the resistors R1 a-c of the corresponding load dump arrangement 401a to the output 302 of the generator 304. The corresponding plurality of first switches SW11 may be opened to disconnect the first power transmission path 308a from the generator. Similarly, the corresponding third switches SW32-SW34 and the corresponding fifth switches (SW52a-c, SW53a-c, SW54a-c) may be closed if a converter failure is detected in the other transmission paths 308b-d and/or two or more of the four transmission paths 308a-d. The same applies if no converter failure is detected but the converter in one or more of the four transmission paths 308a-d is found to be non-operational.

Upon detection of a grid failure, the controlling unit 316 is configured to close one or more of the corresponding fourth switch (SW41, SW42, SW43, SW44), the corresponding fifth switches (SW51a-c, SW52a-c, SW53a-c, SW54a-c) and the corresponding sixth switch (SW61, SW62, SW63, SW64) to connect the at least one resistor (R1a-c, R2a-c, R3a-c, R4a-c) of one or more of the corresponding load dump arrangements 401a-d across the corresponding DC link 314 of the one or more of the plurality of power transmission paths 308a-d. The third switches SW31-SW34 remain open. For example, if the converters 310, 312 of the first power transmission path 308a are operating and a grid failure is detected, the corresponding fourth switch SW41, the corresponding fifth switches SW51a-c and the corresponding sixth switch SW61 may be closed to connect the one or more resistor R1 a-c of the corresponding load dump arrangement 401a across the corresponding DC link 314 of the first power transmission path 308a. Similarly, the corresponding fourth switches SW42-SW44, the corresponding fifth switches (SW52a-c, SW53a-c, SW54a-c) and the corresponding sixth switches SW62-SW64 may be closed if the converters 310, 312 of one or more of the other power transmission paths 308b-d are operating when a grid failure is detected.

Figure 12:
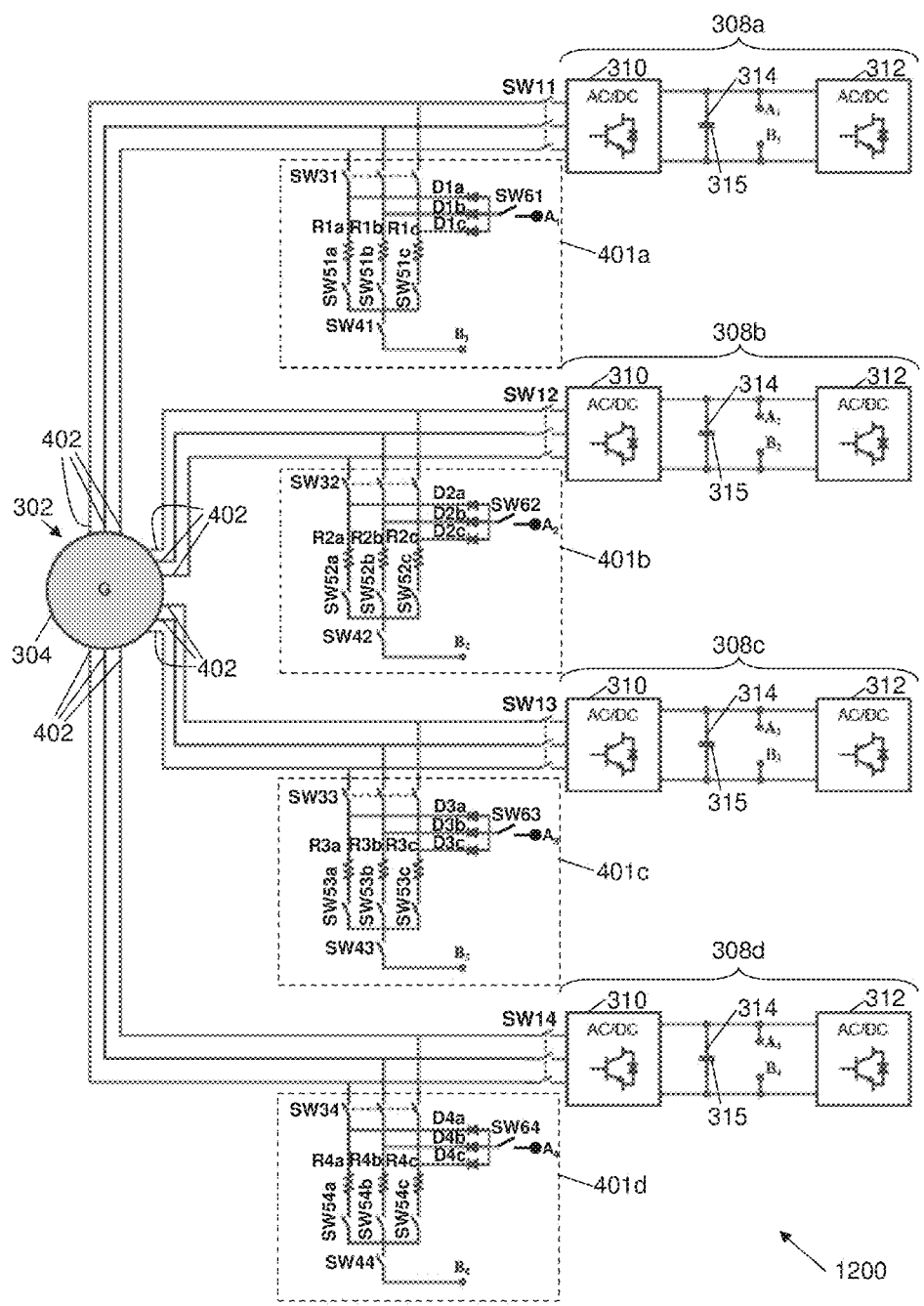
FIG. 12 shows a schematic drawing of a plurality of the load dump arrangements of FIG. 4b usable in a wind turbine having a plurality of power transmission paths according to an embodiment of the present invention.

FIG. 12 shows the load dump arrangement 401 of FIG. 4b usable in one possible embodiment 1200 of the wind turbine of FIG. 11. Similar to the wind turbine 1100 of FIG. 11, the wind turbine 1200 includes a plurality of power transmission paths 308 (e.g. four power transmission paths 308a-d) instead of a single power transmission path 308. Each of the four power transmission paths 308a-d of the wind turbine 1100 is coupled to a corresponding load dump arrangement 401a-d. However, the generator 304 has four sets of three-phase AC output terminals 402. Each power transmission path 308a-d is connected to the corresponding three output terminals 402 of the generator 304. In this embodiment, the generator 304 may be a segmented generator. The operation of the load dump arrangement 401a-d for each power transmission path 308a-d is the same as that described above for FIG. 11. In one embodiment, the load dump arrangement 401a-d can be applied to a segmented generator having more than four sets of three-phase AC output terminals 402.

For the above described embodiments in FIGS. 7 to 12, the fifth switches (SW5a, SW5b, SW5c) for each dump load arrangement 400, 401 may be controlled independently. At least two fifth switches (SW5a, SW5b, SW5c) need to be closed to transfer power from the generator to the load dump arrangement 400, 401. That is, if one fifth switch (e.g. SW5a) is opened, the remaining fifth switches (e.g. SW5b, SW5c) are closed. The independent control of the fifth switches (SW5a, SW5b, SW5c) can increase the reliability of the load dump arrangement 400, 401. For example, if one of the resistors (Ra, Rb, Rc) or electrical connections fails, the remaining two resistors (Ra, Rb, Rc) can dissipate the output power from the generator. In one embodiment, the three fifth switches (SW5a, SW5b, SW5c) may be omitted from the load dump arrangement 400, 401. This will reduce the components count if desired so.

For the above described embodiments in FIGS. 7 to 12, the full power from the generator may be dissipated in a minimum of two resistors (Ra, Rb, Rc) of the load dump arrangement 400, 410 upon detection of a converter failure or when the converter is found to be non-operational. A partial of the generator output power or the full generator output power may be dissipated in a minimum of one resistor (Ra, Rb, Rc) of the load dump arrangement 400, 410 upon detection of a grid failure.

Figure 13:
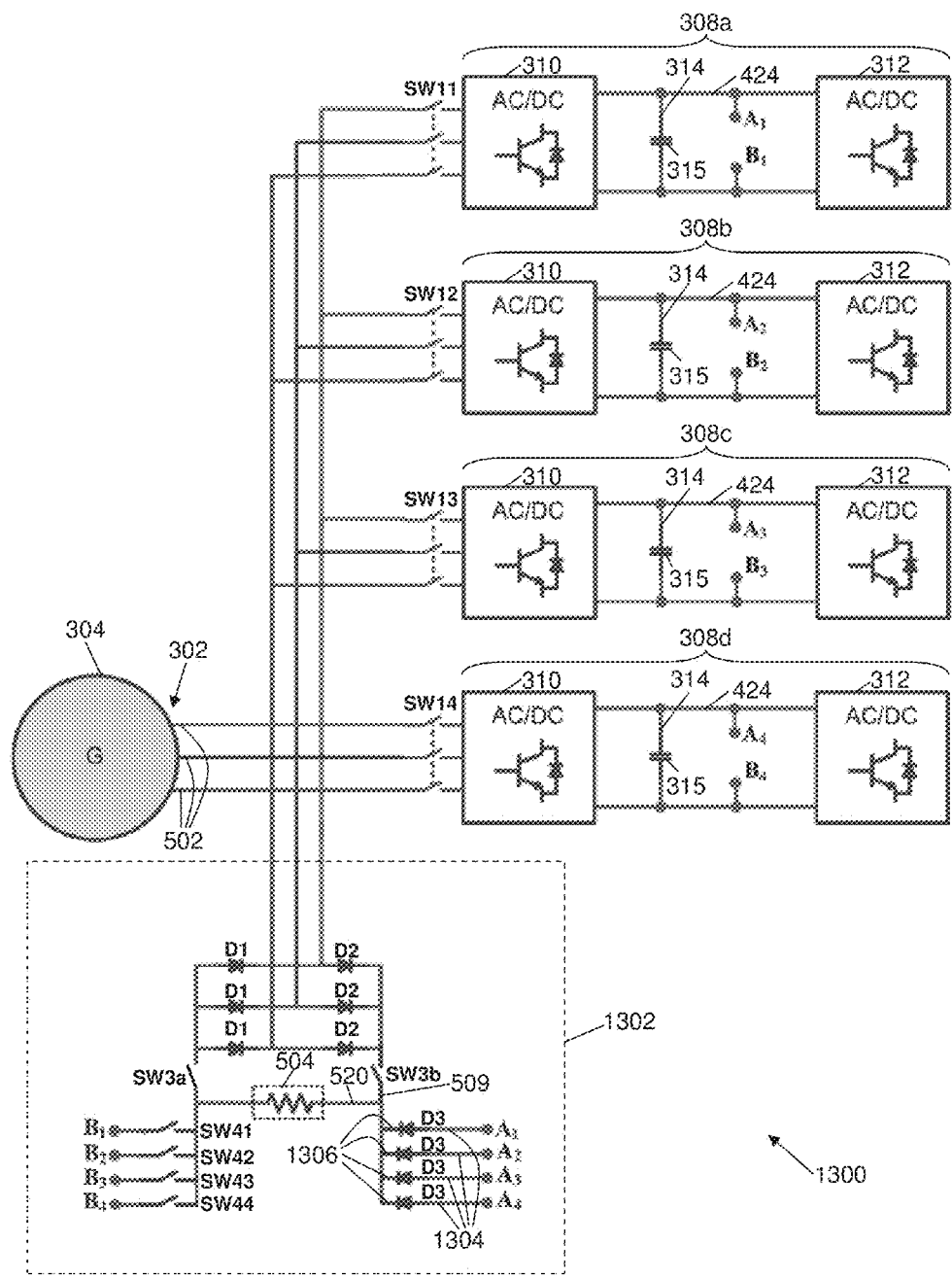
FIG. 13 shows a schematic drawing of one possible embodiment of the load dump arrangement of FIG. 5a usable in a wind turbine having a plurality of power transmission paths according to an embodiment of the present invention.

FIG. 13 shows one possible embodiment 1302 of the load dump arrangement of FIG. 5a usable in one embodiment 1300 of the wind turbine. The wind turbine 1300 differs from the wind turbine of FIG. 5a in that the wind turbine 1300 includes a plurality of power transmission paths 308 (e.g. four power transmission paths 308a-d) instead of a single power transmission path 308. Similarly, the generator 304 has three output terminals 502. Each power transmission path 308a-d is connected to the three output terminals 502. Each power transmission path 308a-d connects the output 302 of the generator 304 to the power grid 306. Each power transmission path 308a-d includes a generator side converter 310 coupled to the output 302 of the generator 304, a grid side converter 312 coupled to the power grid 306, and a DC link 314 coupled between the generator side converter 310 and the grid side converter 312. Each power transmission path 308a-d is connectable to the generator 304 via a corresponding plurality of first switches (SW11, SW12, SW13, SW14) and is connectable to the power grid 306 via a corresponding plurality of second switches (not shown).

The four power transmission paths 308a-d are coupled to the same load dump arrangement 1302. The electrical connections of the load dump arrangement 1302 electrically connect the resistor bank 504 to the output 302 of the generator 304 and each of the plurality of DC links 314 via the plurality of switches. The load dump arrangement 1302 includes a corresponding fourth switch (SW41, SW42, SW43, SW44) for each power transmission path 308a-d. The load dump arrangement 1302 is connectable across the DC link 316 of each power transmission path 308a-d via the corresponding fourth switch (SW41, SW42, SW43, SW44).

The load dump arrangement 1302 is different from the load dump arrangement 500 of FIG. 5a in that the load dump arrangement 1302 further includes a corresponding third diode D3 for each power transmission path 308a-d. Each third diode D3 has an anode 1304 and a cathode 1306. The anode 1304 of each third diode D3 is connected to the first line 424 of the DC link 314 of the corresponding power transmission path 308a-d. The cathode 1306 of each third diode D3 is connected to the second terminal 509 of the second third switch SW3b and the second terminal 520 of the resistor bank 504. As the four power transmission paths 308a-d share the same load dump arrangement 1302, the third diodes D3 are provided in the load dump arrangement 1302 to avoid interaction among the DC links 314 when dissipating power in the load dump arrangement 1302.

Upon detection of a converter failure in one or more of the plurality of power transmission paths 308a-d, the controlling unit 316 is configured to close the third switches SW3a, SW3b to connect the resistor bank 504 of the load dump arrangement 1302 to the output 302 of the generator 304. The corresponding plurality of first switches (SW11, SW12, SW13, SW14) may be opened to disconnect the one or more of the plurality of power transmission paths 308a-d from the generator 304. The fourth switches SW41-SW44 remain open. For example, if a converter failure is detected in the first power transmission path 308a, the third switches SW3a, SW3b may be closed to connect the resistor bank 504 of the load dump arrangement 1302 to the output 302 of the generator 304. The corresponding plurality of first switches SW11 may be opened to disconnect the first power transmission path 308a from the generator 304. The remaining plurality of first switches (SW12, SW13, SW14) may remain closed. The same applies if a converter failure is detected in the other transmission paths 308b-d and/or two or more of the four transmission paths 308a-d. The same applies if no converter failure is detected but the converter in one or more of the four transmission paths 308a-d is found to be non-operational.

Upon detection of a grid failure, the controlling unit 316 is configured to close one or more of the corresponding fourth switch (SW41, SW42, SW43, SW44) to connect the resistor bank 504 of the load dump arrangement 1302 across the corresponding DC link 314 of the one or more of the plurality of power transmission paths 308a-d. The third switches SW3a, SW3b remain open. For example, if the converters 310, 312 of the first power transmission path 308a are operating and a grid failure is detected, the corresponding fourth switch SW41 may be closed to connect the resistor bank 504 of the load dump arrangement 1302 across the corresponding DC link 314 of the first power transmission path 308a. Similarly, the corresponding fourth switches SW42-SW44 may be closed if the converters 310, 312 of one or more of the other power transmission paths 308b-d are operating when a grid failure is detected.

Figure 14:
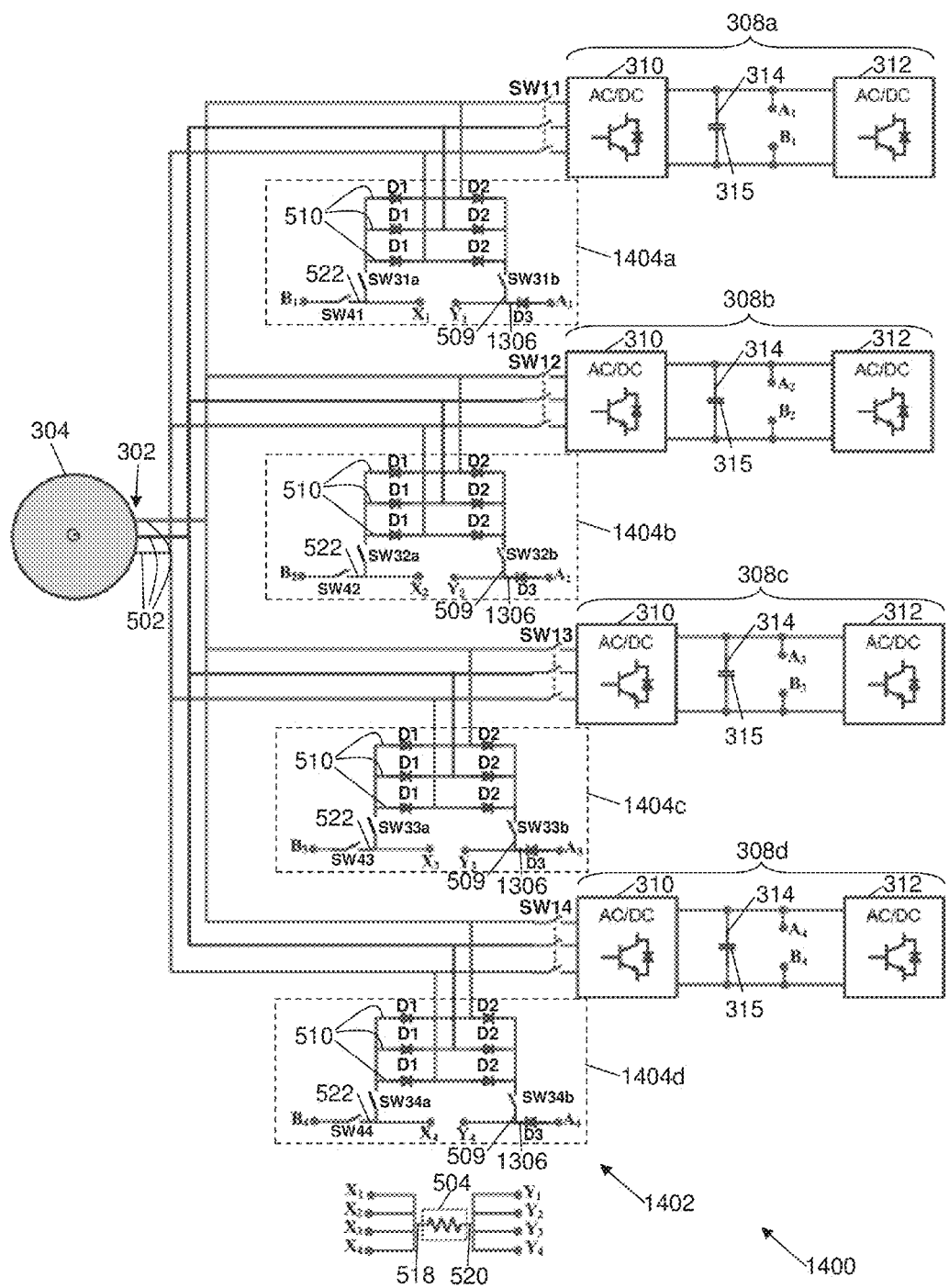
FIG. 14 shows a schematic drawing of one possible embodiment of the load dump arrangement of FIG. 5a usable in a wind turbine having a plurality of power transmission paths according to an embodiment of the present invention.

FIG. 14 shows one embodiment 1402 of the load dump arrangement of FIG. 5a usable in one possible embodiment 1400 of the wind turbine of FIG. 13. Similar to the wind turbine 1300 of FIG. 13, the wind turbine 1400 includes a plurality of power transmission paths 308 (e.g. four power transmission paths 308a-d) instead of a single power transmission path 308. The generator 304 has three output terminals 502. Each power transmission path 308a-d is connected to the three output terminals 502.

The load dump arrangement 1402 includes corresponding electrical connections 1404a-d (including three corresponding first diodes D1, three corresponding second diodes D2, one corresponding third diode D3, one corresponding first third switch SW31a-SW34a, one corresponding second third switch SW31b-SW34b, one corresponding fourth switch SW41-SW44) for each of the four power transmission paths 308a-d of the wind turbine 1400. The electrical connections 1404a-d are similar to the electrical connections of the load dump arrangement 1302 of FIG. 13. The load dump arrangement 1402 includes only one resistor bank 504 which is coupled to the four power transmission paths 308a-d of the wind turbine 1400. The resistor bank 504 is coupled to the electrical connections 1404a-d such that the first terminal 518 of the resistor bank 504 is connected to the first terminals 522 of the fourth switches SW41-SW44 and the anodes 510 of the first diodes D1, and the second terminal 520 of the resistor bank 504 is connected to the cathodes 1306 of the third diodes D3 and the second terminal 509 of the second third switches SW31b-SW34b. As the four power transmission paths 308a-d share the same resistor bank 504, the third diodes D3 are provided to avoid interaction among the DC links 314 when dissipating power in the resistor bank 504.

Upon detection of a converter failure in one or more of the plurality of power transmission paths 308a-d, the controlling unit 316 is configured to close one or more of the corresponding first third switch (SW31a-SW34a) and the corresponding second third switch (SW31b-SW34b) to connect the resistor bank 504 of the load dump arrangement 1402 to the output 302 of the generator 304. One or more of the corresponding plurality of first switches (SW11, SW12, SW13, SW14) may be opened to disconnect the one or more of the plurality of power transmission paths 308a-d from the generator 304. The fourth switches SW41-SW44 remain open. For example, if a converter failure is detected in the first power transmission path 308a, the corresponding third switch SW31 may be closed to connect the resistor bank 504 of the load dump arrangement 1402 to the output 302 of the generator 304. The corresponding plurality of first switches SW11 may be opened to disconnect the first power transmission path 308a from the generator 304. The remaining plurality of first switches (SW12, SW13, SW14) may remain closed. The same applies if a converter failure is detected in the other transmission paths 308b-d and/or two or more of the four transmission paths 308a-d. The same applies if no converter failure is detected but the converter in one or more of the four transmission paths 308a-d is found to be non-operational.

Upon detection of a grid failure, the controlling unit 316 is configured to close one or more of the corresponding fourth switch (SW41, SW42, SW43, SW44) to connect the resistor bank 504 of the load dump arrangement 1402 across the corresponding DC link 314 of the one or more of the plurality of power transmission paths 308a-d. The third switches (SW31a-SW34a, SW31b-SW34b) remain open. For example, if the converters 310, 312 of the first power transmission path 308a are operating and a grid failure is detected, the corresponding fourth switch SW41 may be closed to connect the resistor bank 504 of the load dump arrangement 1402 across the corresponding DC link 314 of the first power transmission path 308a. Similarly, the corresponding fourth switches SW42-SW44 may be closed if the converters 310, 312 of one or more of the other power transmission paths 308b-d are operating when a grid failure is detected.

Figure 15:
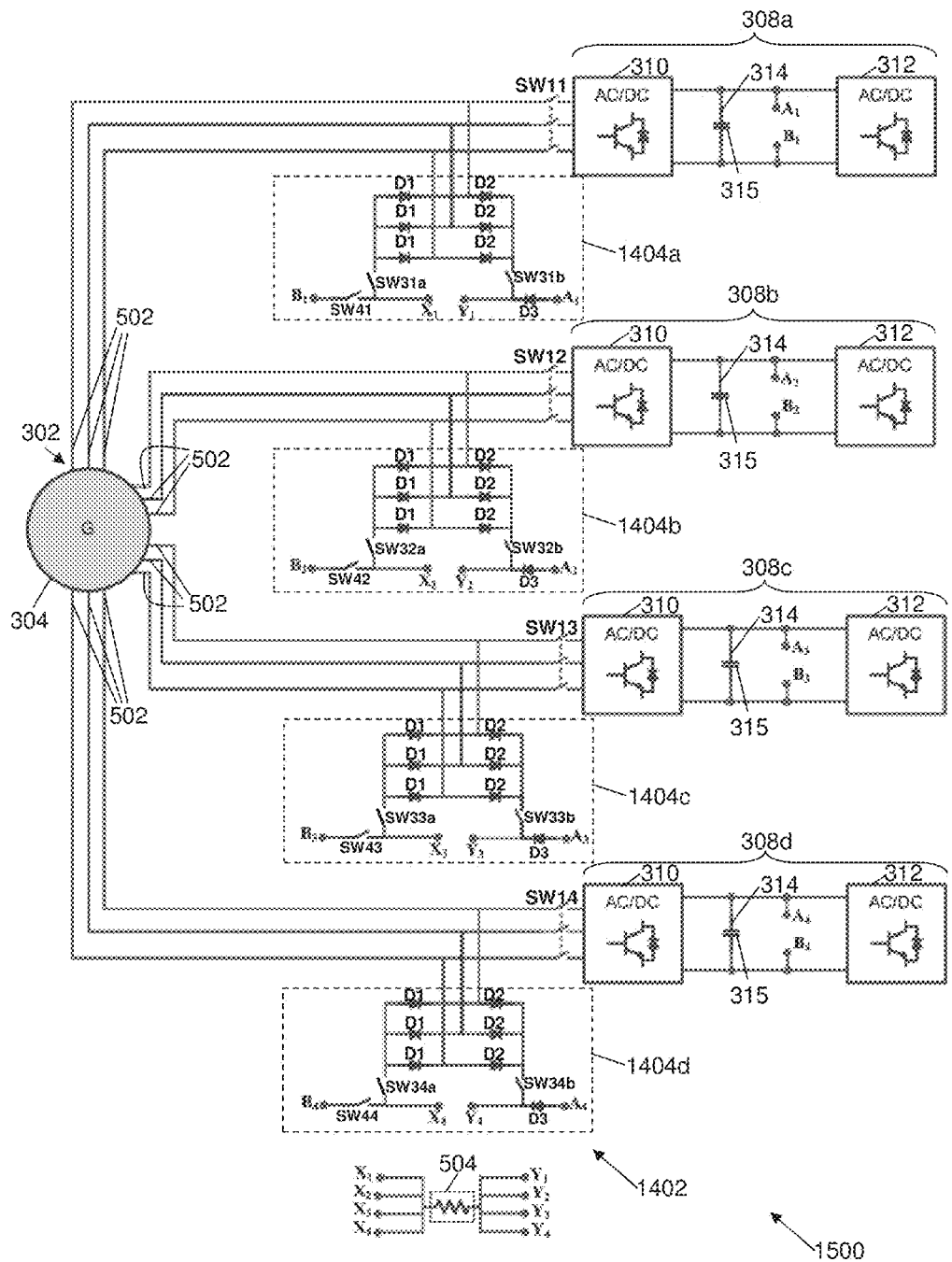
FIG. 15 shows a schematic drawing of one possible embodiment of the load dump arrangement of FIG. 5a usable in a wind turbine having a plurality of power transmission paths according to an embodiment of the present invention.

FIG. 15 shows the load dump arrangement 1402 usable in one possible embodiment 1500 of the wind turbine of FIG. 14. Similar to the wind turbine 1400 of FIG. 14, the wind turbine 1500 includes a plurality of power transmission paths 308 (e.g. four power transmission paths 308a-d) instead of a single power transmission path 308. Each of the four power transmission paths 308a-d of the wind turbine 1500 is coupled to the one resistor bank 504. However, the generator 304 has four sets of three-phase AC output terminals 502. Each power transmission path 308a-d is connected to the corresponding three output terminals 502 of the generator 304. In this embodiment, the generator 304 may be a segmented generator. The wind turbine 1500 includes the same load dump arrangement 1402 as the wind turbine 1400 of FIG. 14. The operation of the load dump arrangement 1402 is the same as that described above for FIG. 14. In one embodiment, the load dump arrangement 1402 can be applied to a segmented generator having more than four sets of three-phase AC output terminals 502.

Figure 16:
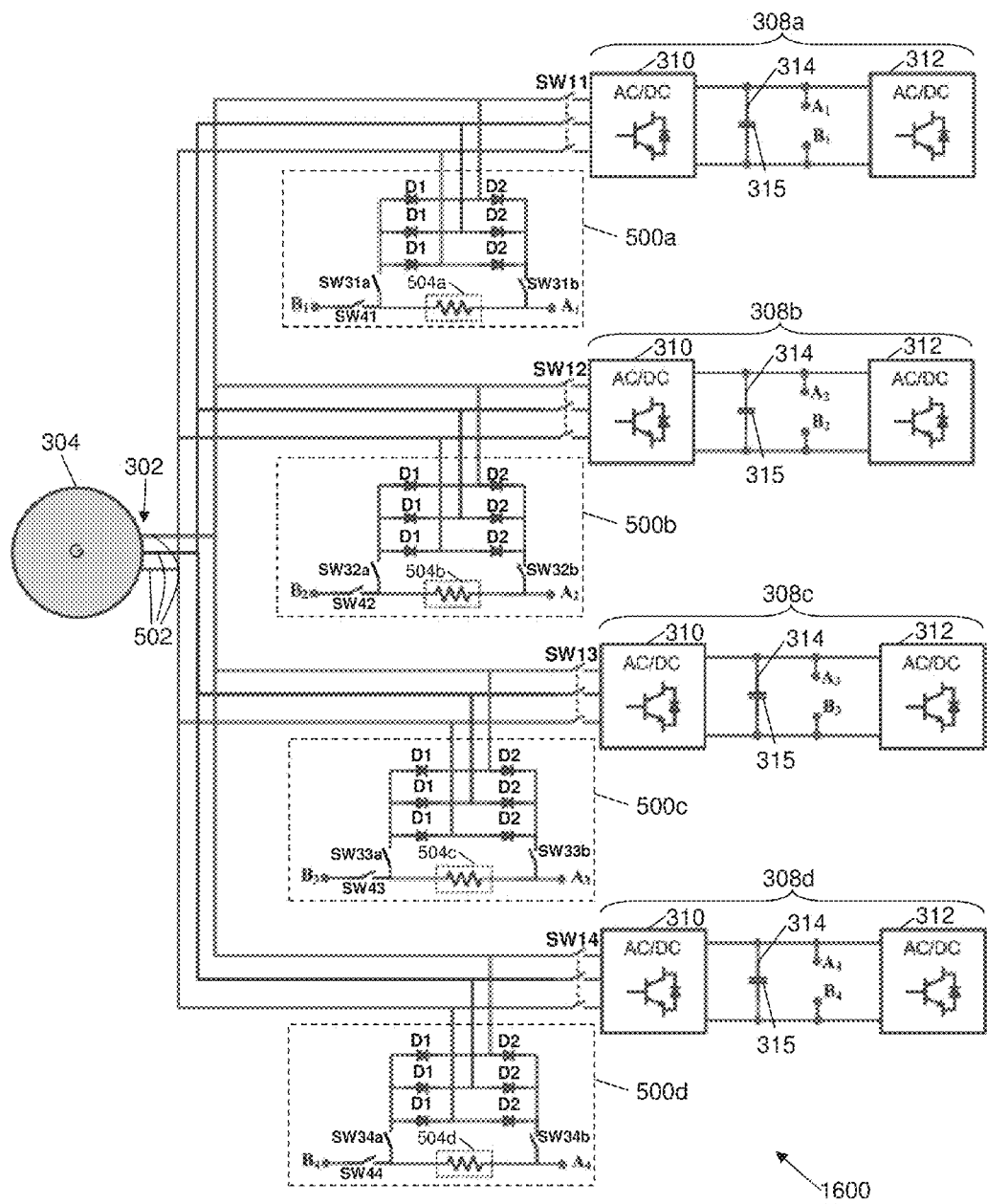
FIG. 16 shows a schematic drawing of a plurality of load dump arrangements of FIG. 5a usable in a wind turbine having a plurality of power transmission paths according to an embodiment of the present invention.

FIG. 16 shows a plurality of load dump arrangements of FIG. 5a usable in another possible embodiment 1600 of the wind turbine of FIG. 14. In this embodiment, the wind turbine 1600 has a corresponding load dump arrangement 500a-d for each power transmission paths 308a-d. Each load dump arrangement 500a-d has a corresponding resistor bank 504a-d. Therefore, the third diodes D3 may not be required in this embodiment.

Upon detection of a converter failure in one or more of the plurality of power transmission paths 308a-d, the controlling unit 316 is configured to close one or more of the corresponding first third switch (SW31a-SW34a) and the corresponding second switch (SW31b-SW34b) to connect the resistor bank 504a-d of the corresponding load dump arrangement 500a-d to the output 302 of the generator 304. One or more of the corresponding plurality of first switches (SW11, SW12, SW13, SW14) may be opened to disconnect the one or more of the plurality of power transmission paths 308a-d from the generator 304. The fourth switches SW41-SW44 remain open. For example, if a converter failure is detected in the first power transmission path 308a, the corresponding third switches SW31a, SW31b may be closed to connect the resistor bank 504a of the corresponding load dump arrangement 500a-d to the output 302 of the generator 304. The corresponding plurality of first switches SW11 may be opened to disconnect the first power transmission path 308a from the generator 304. The remaining plurality of first switches (SW12, SW13, SW14) may remain closed. The same applies if a converter failure is detected in the other transmission paths 308b-d and/or two or more of the four transmission paths 308a-d. The same applies if no converter failure is detected but the converter in one or more of the four transmission paths 308a-d is found to be non-operational.

Upon detection of a grid failure, the controlling unit 316 is configured to close one or more of the corresponding fourth switch (SW41, SW42, SW43, SW44) to connect the resistor bank 504a-d of the corresponding load dump arrangement 500a-d across the corresponding DC link 314 of the one or more of the plurality of power transmission paths 308a-d. The third switches (SW31a-SW34a, SW31b-SW34b) remain open. For example, if the converters 310, 312 of the first power transmission path 308a are operating and a grid failure is detected, the corresponding fourth switch SW41 may be closed to connect the resistor bank 504a of the corresponding load dump arrangement 1602a-d across the corresponding DC link 314 of the first power transmission path 308a. Similarly, the corresponding fourth switches SW42-SW44 may be closed if the converters 310, 312 of one or more of the other power transmission paths 308b-d are operating when a grid failure is detected.

Figure 17:
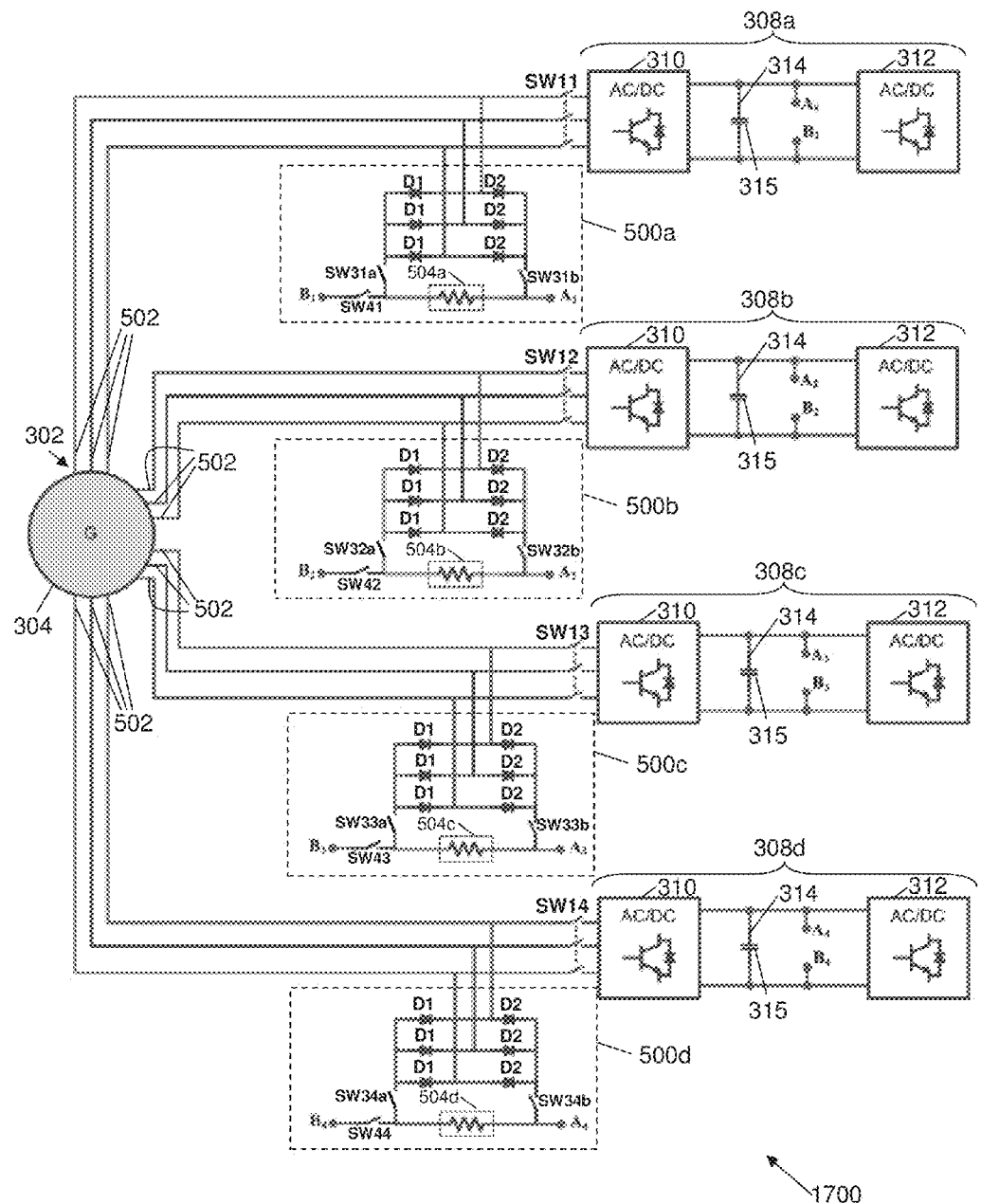
FIG. 17 shows a schematic drawing of the plurality of load dump arrangements of FIG. 5a usable in a wind turbine having a plurality of power transmission paths according to an embodiment of the present invention.

FIG. 17 shows a plurality of load dump arrangements 500a-d usable in one possible embodiment 1700 of the wind turbine of FIG. 16. Similar to the wind turbine 1600 of FIG. 16, the wind turbine 1700 includes a plurality of power transmission paths 308 (e.g. four power transmission paths 308a-d) instead of a single power transmission path 308. Each of the four power transmission paths 308a-d of the wind turbine 1700 is coupled to a corresponding load dump arrangement 500a-d. However, the generator 304 has four sets of three-phase AC output terminals output terminals 502. Each power transmission path 308a-d is connected to the corresponding three output terminals 502 of the generator 304. In this embodiment, the generator 304 may be a segmented generator. The operation of the load dump arrangement 500a-d for each power transmission path 308a-d is the same as that described above for FIG. 16. In one embodiment, the load dump arrangement 500a-d can be applied to a segmented generator having more than four sets of three-phase AC output terminals 502.

The above described load dump arrangements provide one load dump for both converter failures and grid failures. As compared to two separate load dumps for converter failures and grid failures, the single load dump may require a smaller space in the nacelle of the wind turbine. Thus, the weight and size of the nacelle may be reduced. For a wind turbine with a higher power rating, the space required for a single load dump is lesser than two higher rated load dumps.

Further, an effective value of the resistor or active power to be dissipated may be controlled. The equivalent resistor value may vary between two values i.e. $R_{min}$ and $R_{max}$. The values of $R_{min}$ and $R_{max}$ are decided based on maximum generator power and drive train loads.

Further, the numbers of switches, diodes, resistors are not limited to those as described above and as shown in the drawings. The numbers of switches, diodes, resistors may vary in other embodiments of the load dump arrangement and the wind turbine.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wind turbine, comprising:
  a generator, an output thereof being connectable to a power grid via a power transmission path, the power transmission path comprising a generator side converter coupled to the output of the generator, a grid side converter coupled to the power grid, and a DC link coupled between the generator side converter and the grid side converter; and
  a load dump arrangement, comprising:
    at least one resistor,
    a plurality of switches,
    a plurality of electrical connections which electrically connect the at least one resistor to the output of the generator and across the DC link via the plurality of switches.

2. The wind turbine of claim 1,
  wherein the power transmission path is connectable to the generator via a plurality of first switches and is connectable to the power grid via a plurality of second switches.

3. The wind turbine of claim 2,
  wherein the load dump arrangement is connectable to the generator via at least one third switch and is connectable across the DC link of the power transmission path via at least one fourth switch.

4. The wind turbine of claim 3,
  wherein the generator output comprises three terminals, and
  wherein the load dump arrangement comprises:
  a) three third switches respectively comprising a first terminal and a second terminal;
  b) three resistors respectively comprising a first terminal and a second terminal;
  c) three fifth switches respectively comprising a first terminal and a second terminal;
  d) a fourth switch comprising a first terminal and a second terminal;
  e) three sixth switches respectively comprising a first terminal and a second terminal;
  wherein the first terminal of each third switch is connected to a corresponding output terminal of the generator, and the second terminal of each third switch is connected to the second terminal of a corresponding sixth switch and the first terminal of a corresponding resistor;
  wherein the first terminal of each sixth switch is connected to a first line of the DC link;
  wherein the second terminal of each resistor is connected to the first terminal of a corresponding fifth switch;
  wherein the second terminal of each fifth switch is connected to the first terminal of the fourth switch; and
  wherein the second terminal of the fourth switch is electrically connected to a second line of the DC link.

5. The wind turbine of claim 3,
  wherein the generator output comprises three terminals, and
  wherein the load dump arrangement comprises:
  a) three third switches respectively comprising a first terminal and a second terminal;
  b) three diodes respectively comprising an anode and a cathode;
  c) three resistors respectively comprising a first terminal and a second terminal;
  d) three fifth switches respectively comprising a first terminal and a second terminal;
  e) a fourth switch comprising a first terminal and a second terminal;
  f) a sixth switch comprising a first terminal and a second terminal;
  wherein the first terminal of each third switch is connected to a corresponding output terminal of the generator, and the second terminal of each third switch is connected to the cathode of a corresponding diode;
  wherein the anode of each diode is connected to the first terminal of the sixth switch, and the cathode of each diode is further connected to the first terminal of a corresponding resistor;
  wherein the second terminal of the sixth switch is connected to a first line of the DC link;
  wherein the second terminal of each resistor is connected to the first terminal of a corresponding fifth switch;
  wherein the second terminal of each fifth switch is connected to the first terminal of the fourth switch;
  wherein the second terminal of the fourth switch is electrically connected to a second line of the DC link.

6. The wind turbine of claim 3,
  wherein the generator output comprises three terminals, and
  wherein the load dump arrangement comprises:
  a) a first third switch comprising a first terminal and a second terminal;
  b) a second third switch comprising a first terminal and a second terminal;
  c) three first diodes respectively comprising an anode and a cathode and three second diodes respectively comprising an anode and a cathode;
  d) a resistor bank having a plurality of resistors connected in parallel, the resistor bank comprising a first terminal and a second terminal;
  e) a fourth switch comprising a first terminal and a second terminal;
  wherein the cathode of each first diode is connected to the anode of a corresponding second diode and a corresponding output terminal of the generator;
  wherein the anodes of the three first diodes are connected together, and the cathodes of the three second diodes are connected together;
  wherein the first terminal of the first third switch is connected to the anodes of the three first diodes, and the second terminal of the first third switch is connected to the first terminal of the resistor bank;
  wherein the first terminal of the second third switch is connected to the cathodes of three second diodes, and the second terminal of the second third switch is connected to the second terminal of the resistor bank and a first line of the DC link;
  wherein the first terminal of the resistor bank is further connected to the first terminal of the fourth switch; and wherein the second terminal of the fourth switch is connected to a second line of the DC link.

7. The wind turbine of claim 2,
further comprising a controlling unit configured to detect a converter failure or a grid failure, and to control the respective switches.

8. The wind turbine of claim 7,
wherein under normal operating conditions of the wind turbine, the controlling unit is configured to close the plurality of first switches and the plurality of second switches to connect the power transmission path to the generator and the power grid.

9. The wind turbine of claim 7,
wherein upon detection of a converter failure, the controlling unit is configured to connect the at least one resistor of the load dump arrangement to the output of the generator.

10. The wind turbine of claim 9,
wherein upon detection of a converter failure, the controlling unit is configured to open the plurality of first switches to disconnect the power transmission path from the generator.

11. The wind turbine of claim 7,
wherein upon detection of a grid failure, the controlling unit is configured to connect the at least one resistor of the load dump arrangement across the DC link of the power transmission path.

12. The wind turbine of claim 3,
further comprising a plurality of power transmission paths, each power transmission path connecting the output of the generator to the power grid and comprising a generator side converter coupled to the output of the generator, a grid side converter coupled to the power grid, and a DC link coupled between the generator side converter and the grid side converter; wherein the electrical connections electrically connect the at least one resistor to the output of the generator and across each of the plurality of DC links via the plurality of switches.

13. The wind turbine of claim 12,
wherein each power transmission path is connectable to the generator via a corresponding plurality of first switches and is connectable to the power grid via a corresponding plurality of second switches.

14. The wind turbine of claim 12,
wherein the load dump arrangement is connectable across the DC link of each power transmission path via a corresponding at least one fourth switch.

15. The wind turbine of claim 12,
wherein upon detection of a converter failure in one or more of the plurality of power transmission paths, the controlling unit is configured to close the at least one third switch or one or more of the at least one third switch to connect the at least one resistor of the load dump arrangement to the output of the generator.

16. The wind turbine of claim 15,
wherein upon detection of a converter failure in one or more of the plurality of power transmission paths, the controlling unit is configured to open the corresponding plurality of first switches to disconnect the one or more of the plurality of power transmission paths from the generator.

17. The wind turbine of claim 14,
wherein upon detection of a grid failure, the controlling unit is configured to close the corresponding at least one fourth switch or one or more of the corresponding at least one fourth switch to connect the at least one resistor of the load dump arrangement across the corresponding DC link of the one or more of the plurality of power transmission paths.

18. The wind turbine of claim 12,
further comprising a plurality of load dump arrangements, each load dump arrangement being connectable to the generator via a corresponding at least one third switch or one or more of a corresponding at least one third switch and corresponding fifth switches, and being connectable across the DC link of the corresponding power transmission path via a corresponding at least one fourth switch or one or more of a corresponding at least one fourth switch, the corresponding fifth switches and corresponding one or more sixth switches.

19. The wind turbine of claim 18,
wherein upon detection of a converter failure in one or more of the plurality of power transmission paths, the controlling unit is configured to close the corresponding at least one third switch or one or more of the corresponding at least one third switch and the corresponding fifth switches to connect the at least one resistor of one or more of the corresponding load dump arrangements to the output of the generator.

20. The wind turbine of claim 19,
wherein upon detection of a converter failure in one or more of the plurality of power transmission paths, the controlling unit is configured to open one or more of the corresponding plurality of first switches to disconnect the one or more of the plurality of power transmission paths from the generator.

21. The wind turbine of claim 18,
wherein upon detection of a grid failure, the controlling unit is configured to close the corresponding at least one fourth switch or one or more of the corresponding at least one fourth switch, the corresponding fifth switches and the corresponding one or more sixth switches to connect the at least one resistor of one or more of the corresponding load dump arrangements across the corresponding DC link of the one or more of the plurality of power transmission paths.

22. The wind turbine of claim 18,
wherein the switches comprise any one of a group consisting of breakers, contactors and semiconductor power switches.

* * * * *